(12) United States Patent
Mori et al.

(10) Patent No.: US 7,295,277 B2
(45) Date of Patent: Nov. 13, 2007

(54) LIQUID CRYSTAL DISPLAY APPARATUS WITH SPACER POSITIONED OVER CONTACT HOLE

(75) Inventors: Junichi Mori, Kyoto (JP); Shigeru Uemura, Matsubara (JP); Katsuhiro Kikuchi, Tenri (JP); Masahiro Yoshida, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 270 days.

(21) Appl. No.: 10/935,750

(22) Filed: Sep. 8, 2004

(65) Prior Publication Data

US 2005/0052607 A1    Mar. 10, 2005

(30) Foreign Application Priority Data

Sep. 8, 2003   (JP)   ............................. 2003-315550
Aug. 3, 2004   (JP)   ............................. 2004-226279

(51) Int. Cl.
    *G02F 1/1339*  (2006.01)
(52) U.S. Cl. .................. 349/155; 349/138; 349/139; 349/156
(58) Field of Classification Search ......... 349/155–157
    See application file for complete search history.

(56) References Cited

U.S. PATENT DOCUMENTS

| | | | |
|---|---|---|---|
| 5,978,061 A * | 11/1999 | Miyazaki et al. ........... | 349/155 |
| 6,088,071 A | 7/2000 | Yamamoto et al. | |
| 6,195,140 B1 * | 2/2001 | Kubo et al. ................... | 349/44 |
| 6,204,905 B1 * | 3/2001 | Koma et al. ................. | 349/138 |
| 6,580,226 B1 * | 6/2003 | Manabe et al. .......... | 315/169.4 |
| 6,788,375 B2 | 9/2004 | Ogishima et al. | |
| 2002/0075441 A1 | 6/2002 | Fujimori et al. | |
| 2004/0189928 A1 * | 9/2004 | Yang et al. ................. | 349/155 |

FOREIGN PATENT DOCUMENTS

| | | |
|---|---|---|
| JP | 10-62789 A | 3/1998 |
| JP | 10-96955 A | 4/1998 |
| JP | 11-258613 A | 9/1999 |
| JP | 2000-122071 A | 4/2000 |
| JP | 2001-166317 A | 6/2001 |
| JP | 2002-169166 A | 6/2002 |
| JP | 2002-174817 A | 6/2002 |
| KR | 1998-076705 A | 11/1998 |
| KR | 2000-0039271 A | 7/2000 |

OTHER PUBLICATIONS

Machine translation of JP 2000-122071 to Yamada et al., made of record by the applicant.*

* cited by examiner

*Primary Examiner*—Andrew Schechter
(74) *Attorney, Agent, or Firm*—Nixon & Vanderhye P.C.

(57) ABSTRACT

A columnar spacer is interposed between a first substrate and a second substrate for holding a liquid crystal layer between them. The columnar spacer is formed in such a manner as to have an area superposed, in each pixel, with the contact hole formed in the first substrate and an area not superposed with said contact hole. Even in the case where the first and second substrates attached to each other are displaced from each other, the columnar spacer never falls in the contact hole and a desired cell gap can be positively secured. Also, since the columnar spacer is not located in the contact hole, no margin for substrate attachment is required to form the contact hole in the first substrate, thereby improving the open area ratio effective for display for improved display quality.

28 Claims, 17 Drawing Sheets

TAPER INEFFECTIVE REGION

US 7,295,277 B2

LIQUID CRYSTAL DISPLAY APPARATUS WITH SPACER POSITIONED OVER CONTACT HOLE

This Nonprovisional application claims priority under 35 U.S.C. § 119(a) on Patent Application No. 2003-315550 filed in Japan on Sep. 8, 2003 and Patent Application No. 2004-226279 filed in Japan on Aug. 3, 2004, the entire contents of which are hereby incorporated by reference.

BACKGROUND OF THE INVENTION

1. Field of the Invention

The present invention relates to a liquid crystal display apparatus wherein a pair of substrates holding a liquid crystal layer therebetween are attached to each other through a columnar spacer.

2. Description of the Prior Art

In recent years, a liquid crystal display apparatus, taking advantage of the features that it is both thin and low in power consumption, has been widely used for OA equipment such as a word processor and a personal computer, the portable information equipment such as an electronic dictionary or a single-unit video tape recorder having a liquid crystal monitor.

The liquid crystal display apparatus, which is not a self luminous display apparatus such as a CRT (Braun tube) or EL (electroluminescence), is generally divided into a reflection type and a transmission type. In the transmission-type liquid crystal display apparatus, light from a lighting unit (what is called back light) arranged on the back of a liquid crystal display panel is used for display, while the reflection-type liquid crystal display apparatus uses ambient light for display.

The transmission-type liquid crystal display apparatus uses the light from the back light for display, and therefore has the advantage that it is hardly affected by the brightness of the ambiance, and can display an image with a high contrast. The provision of the back light, however, leads to the disadvantage of a large power consumption. Incidentally, about 50% or more of the entire power consumed by the normal transmission-type liquid crystal display apparatus is consumed by the back light. Also, in a very bright operating environment (such as outdoor under the cloudless sky), the visibility is decreased. If the brightness of the back light is increased to maintain the visibility, on the other hand, the power consumption is further increased.

The reflection-type liquid crystal display apparatus, on the other hand, has no back light and therefore has the advantage of a very low power consumption. This makes the reflection-type liquid crystal display apparatus a suitable display for outdoor use. The reflection-type liquid crystal display apparatus, however, has the disadvantage that the visibility is low in a dark operating environment.

As a liquid crystal display apparatus compensating for the disadvantages of the transmission-type and reflection-type liquid crystal display apparatuses, a transmission/reflection-type liquid crystal display apparatus has been proposed in recent years as a liquid display apparatus having the dual display functions of transmission and reflection types.

In the transmission/reflection-type liquid crystal display apparatus, both a reflection pixel electrode for reflecting the ambient light and a transmission pixel electrode for transmitting the light from the back light are arranged in one pixel area (picture element area). In accordance with the operating environment (ambient brightness), therefore, display can be switched between transmission mode and reflection mode or both modes can be used for display at the same time.

The transmission/reflection-type liquid crystal display apparatus, therefore, has both the feature of the reflection-type liquid crystal display apparatus that the power consumption is low and the feature of the transmission-type liquid crystal display apparatus that the operation is not hardly affected by the ambient brightness and an image can be brightly displayed with a high contrast. Further, the transmission/reflection-type liquid crystal display apparatus offsets the disadvantage of the transmission-type liquid crystal display apparatus that the visibility is decreased in a very bright operating environment (such as outdoor under the cloudless sky).

A transmission/reflection-type liquid crystal display apparatus has been proposed, in which the transmissive region and the reflective region on the TFT substrate have different thickness of the birefringent liquid crystal layer to realize what is called a multigap (see Patent Document 1, for example). The liquid crystal display apparatus of this type is described briefly below.

FIG. 15 is a sectional view showing a general configuration of a liquid crystal display apparatus of multigap type. FIG. 16 is a plan view of a first substrate 101 formed with a TFT 106 of the liquid crystal display apparatus. In this liquid crystal display apparatus, a liquid crystal layer 103 is held between the first substrate 101 and the second substrate 102.

As shown in FIG. 16, a plurality of gate wires 104 and a plurality of source wires 105 are formed at right angles to each other on the first substrate 101. The portion defined by adjacent gate wires 104 and adjacent source wires 105 forms one pixel. At each intersection between the gate wire 104 and the source wire 105, a TFT 106 is formed as a switching element. The drain electrode 106a of the TFT 106 is arranged in such a manner as to cross a gate insulating film 108 covering an auxiliary capacitance electrode 107, as shown in FIG. 15.

Also, a transparent electrode 109 electrically connected to the drain electrode 106a is formed on the first substrate 101. A partial area of the transparent electrode 109 makes up a transmissive region for controlling the light transmission. The area other than the transmissive region on the first substrate 101 is formed with an inter-layer insulating film 110. A reflection electrode 111 is formed on the inter-layer insulating film 110. The area in which the reflection electrode 111 is formed constitutes a reflective region for controlling the reflection of the ambient light. An orientation film 112 is formed on the transparent electrode 109 and the reflection electrode 111.

Also, the boundary between the transmissive region and the reflective region of the inter-layer insulating film 110 is formed with a taper, and the reflection electrode 111 is formed also on the surface of the taper. When light is radiated on the reflection electrode 111 formed on the tapered portion, the reflected light is contained between the pair of the substrates and cannot exit, with the result that the light utilization efficiency is reduced. The area of the reflection electrode 111 formed on the tapered portion is not contributive to the display of the incident light and therefore, hereinafter referred to as a taper ineffective region.

On the other hand, a colored layer 113, an opposite electrode 114 and an orientation film 115 are stacked in this order on the second substrate 102.

In the liquid crystal display apparatus described above, the first substrate 101 and the second substrate 102 are attached to each other with a columnar spacer 116 arranged in the reflective region so that the thickness Td of the liquid crystal layer 103 in the transmissive region is about twice as large as the thickness Rd of the liquid crystal layer 103 in the reflective region. In this way, by realizing different cell gaps for the transmissive region and the reflective region, the phase difference (And) is substantially equalized between the transmissive region and the reflective region thereby to improve the display characteristic.

Incidentally, in order to realize the multigap described above, it is necessary to form a thin inter-layer insulating film 110 or remove the inter-layer insulating film 110 on the first substrate 101 in the transmissive region. Generally, the inter-layer insulating film 110 is formed of a photosensitive resin, and the thickness thereof is controlled by photolithography. Specifically, by adjusting the time of light exposure to the transmissive region, the thickness of the inter-layer insulating layer 110 to be removed at the time of development can be determined.

Also, a configuration in which a columnar spacer is arranged between a pair of substrates holding the liquid crystal layer therebetween is disclosed, for example, in Patent Document 2.

FIG. 17 is a sectional view showing a general configuration of the liquid crystal display apparatus described in Patent Document 2. In this liquid crystal apparatus, an auxiliary capacitance electrode 204 is formed in the same layer as the data wire through a gate insulating film 203 on the address wire 202 of the surface of a first substrate 201, and an auxiliary capacitor 205 is formed of the auxiliary capacitance electrode 204 and the address wire 202. A contact hole 207 is formed in the portion of the inter-layer insulating film 206 formed with the auxiliary capacitor 205. The auxiliary capacitance electrode 204 and the pixel electrode 208 formed on the inter-layer insulating film 206 are electrically connected to each other by the contact hole 207.

On the other hand, a color filter 212 is formed on the one hand and a columnar spacer 213 is formed by a stack of colored layers on the second substrate 211. The first substrate 201 and the second substrate 211 are attached to each other through a liquid crystal layer 214 so that the forward end of the columnar spacer 213 is arranged in the contact hole 207.

In the liquid crystal display apparatus described in Patent Document 3, a columnar spacer for holding the pair of substrates at a predetermined interval to hold the liquid crystal is formed of a resin material blackened by nonelectrolyte plating thereby to prevent the irregular reflection of the light and thus to prevent the reduction in contrast.

[Patent Document 1] Japanese Unexamined Patent Publication No. 2002-72220
[Patent Document 2] Japanese Unexamined Patent Publication No. 10-96955
[Patent Document 3] Japanese Unexamined Patent Publication No. 2002-174817

The size of the columnar spacer 116 fails to be sufficiently studied in Patent Document 1. When the attachment between the first substrate 101 and the second substrate 102 is displaced, therefore, the columnar spacer 116 may fall in the contact hole (in the case of FIG. 15, the transmissive region portion free of the inter-layer insulating film 110), thereby posing the problem that a desired cell gap cannot be positively secured.

Similarly in the case where the columnar spacer 213 is located in the contact hole 207 as described in Patent Document 2, the displacement between the first substrate 201 and the second substrate 211 attached to each other and hence the displacement of the coordinates between the columnar spacer 213 and the contact hole 207 would make it impossible to contain the columnar spacer 213 in the contact hole 207 and thus to secure the desired thickness of the liquid crystal layer 214.

For example, assume that the attachment accuracy between the first substrate 201 and the second substrate 211 (attachment margin A) is 5 μm in horizontal and vertical directions and the diameter of the columnar spacer 213 is 12 μm. In order to contain the columnar spacer 213 securely in the contact hole 207, the inner diameter of the bottom portion of the contact hole 207 is required to be at least 22 μm.

In the case where the contact hole 207 is formed in the reflective region, for example, the liquid crystal layer 214 in the area formed with the contact hole 207 has no desired thickness and constitutes an ineffective region not contributive to display. This ineffective region is increased by the attachment margin A, thereby posing the problem of a reduced open area ratio. Also, in the attachment margin A, i.e. the region of at least 5 μm around the columnar spacer 213, an area remains where the thickness of the liquid layer 214 is larger than the desired value, thereby probably causing a reduced contrast (the particular area, even if contributive to the display, adversely affects the display).

SUMMARY OF THE INVENTION

This invention has been achieved to solve the problems described above, and an object thereof is to provide a liquid crystal display apparatus in which even in the case where a pair of substrates attached to each other for holding a liquid crystal layer are displaced from each other, a desired cell gap can be secured positively on the one hand and the open area ratio effective for display can be improved for improved display quality on the other hand.

In order to achieve this object, according to the invention, there is provided a liquid crystal display apparatus comprising a pair of substrates for holding a liquid crystal layer therebetween, a columnar spacer arranged between the two substrates and a plurality of pixels for display, wherein the columnar spacer and a contact hole are arranged in the pixel, and the columnar spacer has, in a cross section parallel to the substrates, both an area superposed with the contact hole and an area not superposed therewith.

With the configuration described above, even in the case where the pair of substrates attached to each other are displaced from each other, the substrates can be maintained at a desired interval therebetween in the area of the columnar spacer not superposed with the contact hole. Even in the case where the attachment of the substrate pair is displaced, therefore, the liquid crystal layer held between them can be maintained in a desired thickness.

Also, the cross section of the columnar spacer of the pixel parallel to the substrates has both an area superposed with the contact hole and an area not superposed with the contact hole. Even in the case where the substrates attached to each other are displaced from each other, therefore, the columnar spacer is not accommodated in the contact hole. In forming the contact hole in one of the substrates, therefore, unlike in the prior art, the attachment margin formed taking the displacement of the columnar spacer into consideration is not required. As a result, the columnar spacer can be designed and arranged in such a manner that enlargement of an ineffective region of the pixel not contributing to display is avoided while preventing the size of the display area from decreasing, i.e. preventing the open area ratio of each pixel from decreasing at the same time. Thus, the contrast reduction can be avoided for improved display quality.

Specifically, according to this invention, even in the case where the substrates attached to each other are displaced from each other during the existing process, the columnar spacer can be arranged not to fall in the contact hole and can cover at least a part of the opening. As a result, the proper thickness of the liquid crystal layer can be positively maintained. Also, the ineffective region is reduced between the two areas of the contact hole and the columnar spacer, and the open area ratio of each pixel effective to display can be increased for improved display quality.

DESCRIPTION OF THE DRAWINGS

The above and other objects and features will be made more apparent by the detailed description of preferred embodiments taken in conjunction with the accompanying drawings.

DESCRIPTION OF THE PREFERRED EMBODIMENTS

Embodiment 1

An embodiment of this invention is explained below with reference to the drawings.

Figure 1:
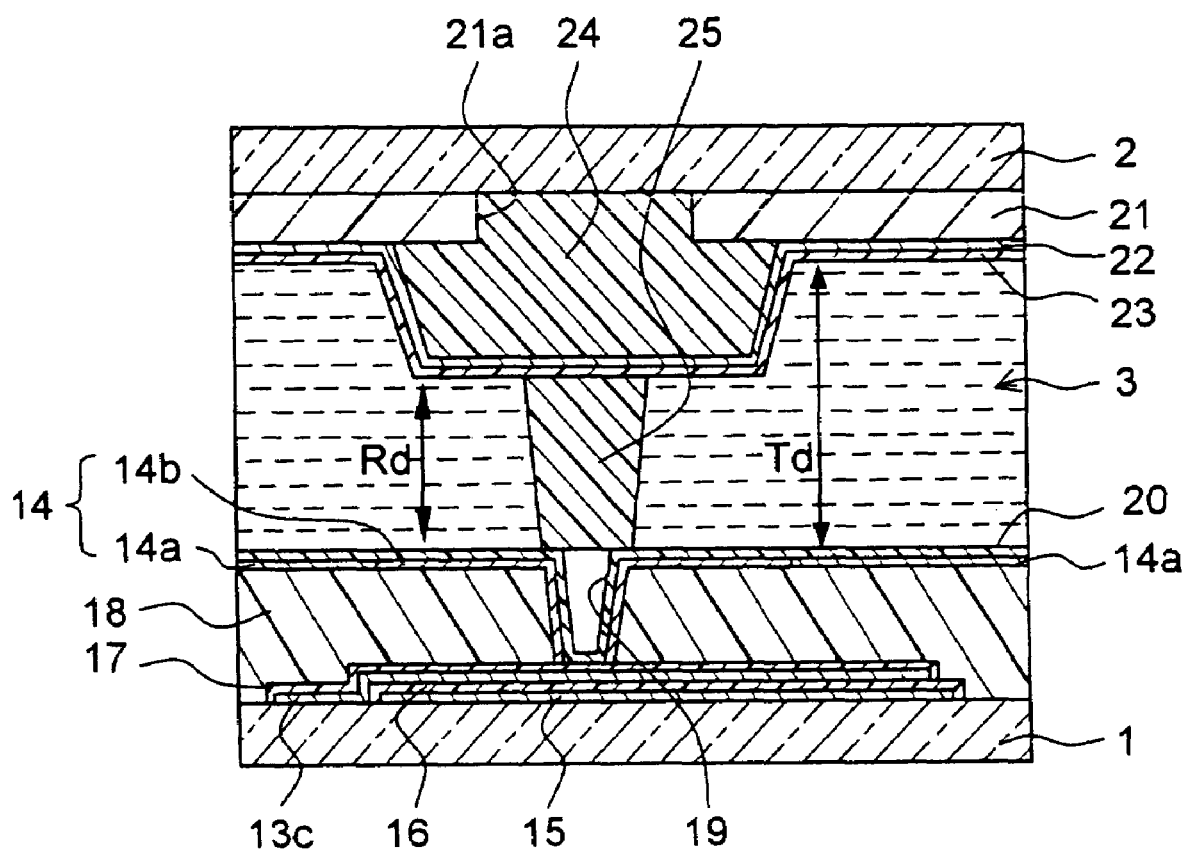
FIG. 1 is a sectional view showing a general configuration of a liquid crystal display apparatus according to an embodiment of the invention.
Figure 2:
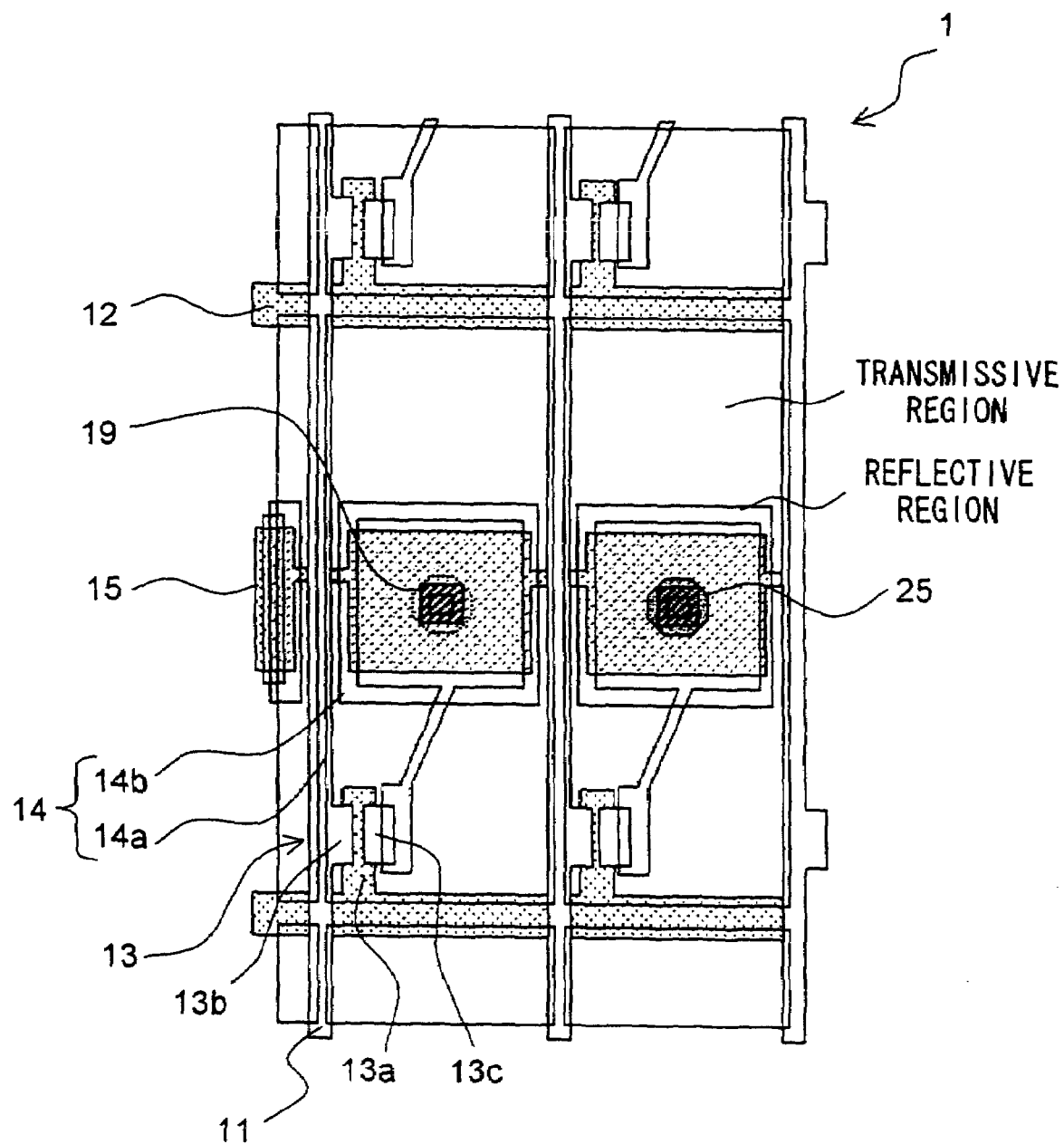
FIG. 2 is a plan view of one of the substrates making up the above-mentioned liquid crystal display apparatus.

FIG. 1 is a sectional view schematically showing a liquid crystal display apparatus according to this embodiment, and FIG. 2 a plan view of a first substrate 1 of the liquid crystal display apparatus.

The liquid crystal display apparatus according to this embodiment is a transmission/reflection-type liquid crystal display apparatus having a transmissive region and a reflective region, and comprises a pair of substrates including a first substrate 1 and a second substrate 2 holding a liquid crystal layer 3 between them. According to this embodiment, a liquid crystal that can be driven in ECB (electrically controlled birefringence) mode is used as the liquid crystal layer 3. In other words, the liquid crystal display apparatus according to this embodiment employs a method to control the transmission and cut-off of incident light utilizing the birefringence of the liquid crystal.

First, a configuration of the first substrate 1 side is explained.

The first substrate 1 is configured of an insulating transparent substrate (such as a glass substrate), and as shown in FIG. 2, the surface thereof is formed with a plurality of source bus lines 11 and a plurality of gate bus lines 12 arranged at right angles to each other. The portion defined by adjacent source bus lines 11 and adjacent gate bus lines 12 makes up one pixel. The pixels are therefore arranged in matrix. The source bus lines 11 and the gate bus lines 12 function as electrical wiring for supplying a voltage to each pixel.

At the intersection between each source bus line 11 and a corresponding gate bus line 12, a TFT (thin film transistor) 13 is arranged as an active switching element for switching on/off each pixel. A gate electrode 13a of the TFT 13 is connected to the gate bus line 12, a source electrode 13b is connected to the source bus line 11, and a drain electrode 13c is connected to a pixel electrode 14. Also, the first substrate 1 is formed with an auxiliary capacitance electrode 15 thereon, and a gate insulating film 16 is formed in such a manner as to cover the auxiliary capacitance electrode 15.

The pixel electrode 14 is configured of a transparent electrode 14a and a reflection electrode (reflector) 14b. The transparent electrode 14a is configured of, for example, a transparent conductive film of ITO. The reflection electrode 14b is configured of a metal film of, for example, Al or Ag. Inter-layer insulating films 17 and 18 are stacked in this order on the drain electrode 13c, and the transparent electrode 14a and the reflection electrode 14b are formed on the surface (uneven surface) of the inter-layer insulating film 18. Specifically, the inter-layer insulating film 18 covers at least a part of the TFT 13, and the pixel electrode 14 is formed in a layer above at least a part of the inter-layer insulating film 18.

In each pixel, the area formed with the transparent electrode 14a makes up a transmissive region for transmission-type display by controlling the transmission of the light emitted from a light source not shown. The area formed with the reflection electrode 14b, on the other hand, makes up a reflective region for reflection-type display by controlling the reflection of external light.

Specifically, according to this embodiment, the pixel electrode 14 formed on the first substrate 1 is configured as a hybrid of the transparent electrode 14a arranged in the transmissive region and the reflection electrode 14b arranged in the reflective region. These electrodes are segmented in plane.

In view of the fact that a single pixel has both a transmissive region and a reflective region therein as described above, the display is possible for each pixel either in one of the transmission mode and the reflection mode or in both modes at the same time.

Incidentally, the reflection electrode 14b may not be formed with a transparent electrode 14a just thereunder as in this embodiment, or may be formed (with electrical connection) on the transparent electrode 14a. Also, the transparent electrode 14a and the reflection electrode 14b may be electrically connected to each other with each end (boundary) thereof partially superposed or superposed at other parts thereof The reflective region is formed with a contact hole 19 for electrically connecting the pixel electrode 14 (reflection electrode 14b) and the drain electrode 13c to each other. This contact hole 19 is formed, for example, by removing the inter-layer insulating film 18 by photolithography. An orientation film 20 is formed on the liquid crystal layer 3 side of the pixel electrode 14.

Next, a configuration of the second substrate 2 side is explained.

The second substrate 2 is configured of an insulating transparent substrate (such as a glass substrate), and on the surface thereof, a colored layer 21 constituting a color filter, an opposite electrode 22 of ITO (indium tin oxide) or the like and an orientation film 23 are stacked.

The colored layer 21 is arranged at a position matched with the pixel formed where the opposite electrode 22 and the pixel electrode 14 are in opposed relation to each other. Also, the colored layer 21 has an opening 21a in a part of the reflective region. The transmissive region and the reflective region are formed with the colored layer 21 of the same pigment concentration. The provision of the opening 21a in the reflective region, therefore, makes it possible to match the brightness between the transmission-type display and the reflection-type display.

Also, in the second substrate 2, the transparent layer 24 is formed in such a manner as to close the opening 21a of the colored layer 21. In the reflective region, the opposite electrode 22 is formed on this transparent layer 24. The transparent layer 24 is formed in substantially the same size as the reflection electrode 14b on the first substrate 1 side in such a manner that the thickness of the liquid crystal layer 3 in the transmissive region is larger than the thickness of the liquid crystal layer 3 in the reflective region. Specifically, the thickness Td of the liquid crystal layer 3 in the transmissive region is about twice as large as the thickness Rd of the liquid crystal layer 3 in the reflective region. As a result, the optical length can be matched between the reflection-type display and the transmission-type display.

Figure 15:
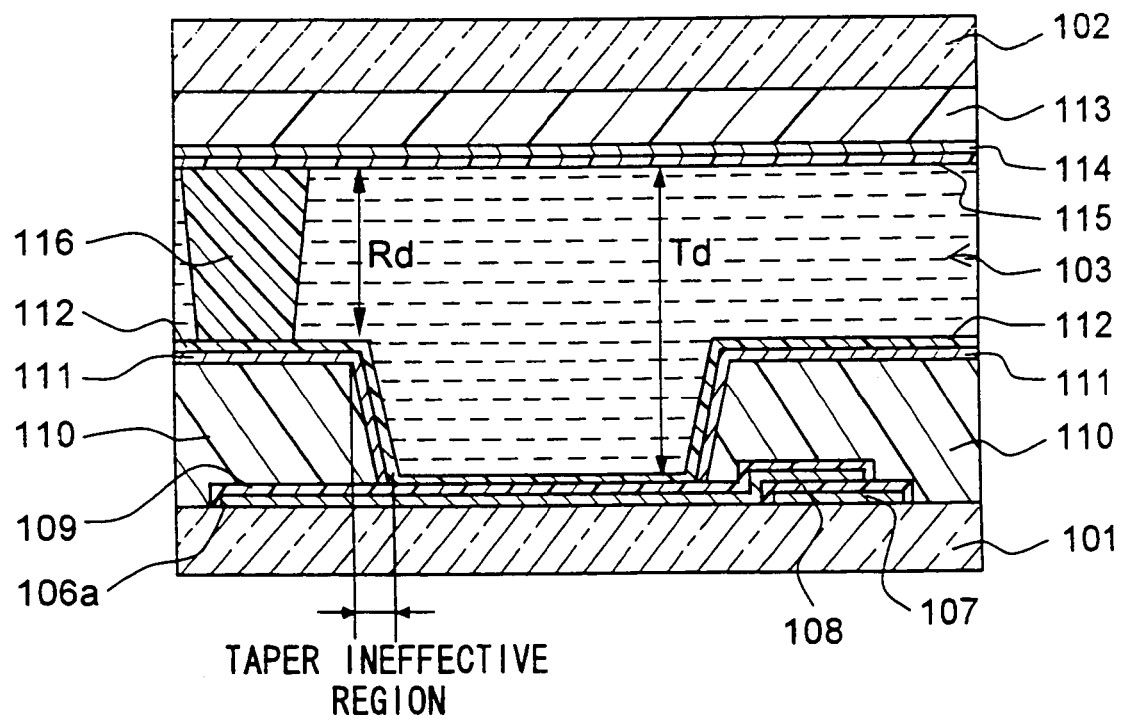
FIG. 15 is a sectional view showing a general configuration of the conventional liquid crystal display apparatus of multigap type.
Figure 16:
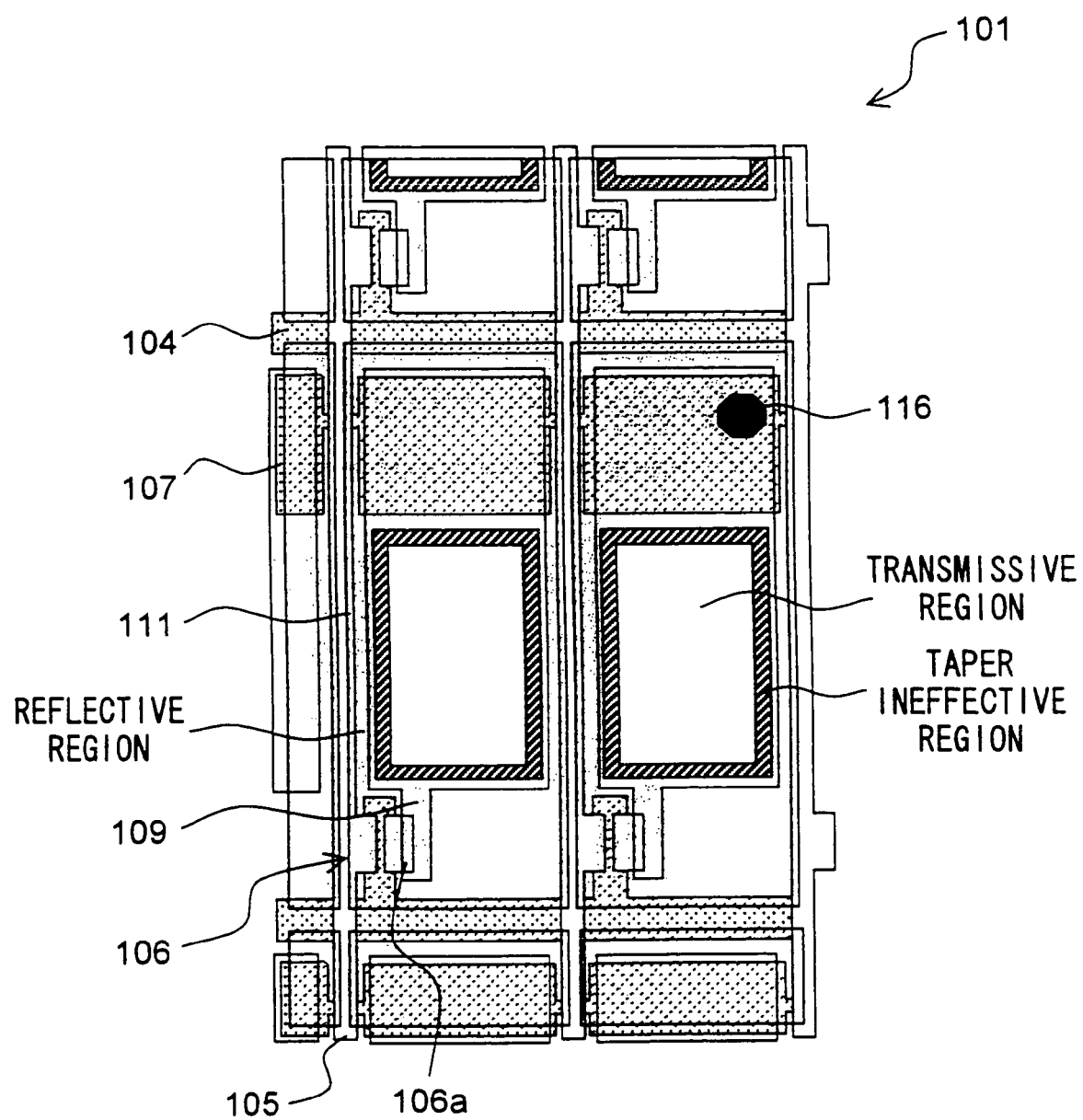
FIG. 16 is a plan view of one of the substrates making up the above-mentioned liquid crystal display apparatus.
Figure 17:
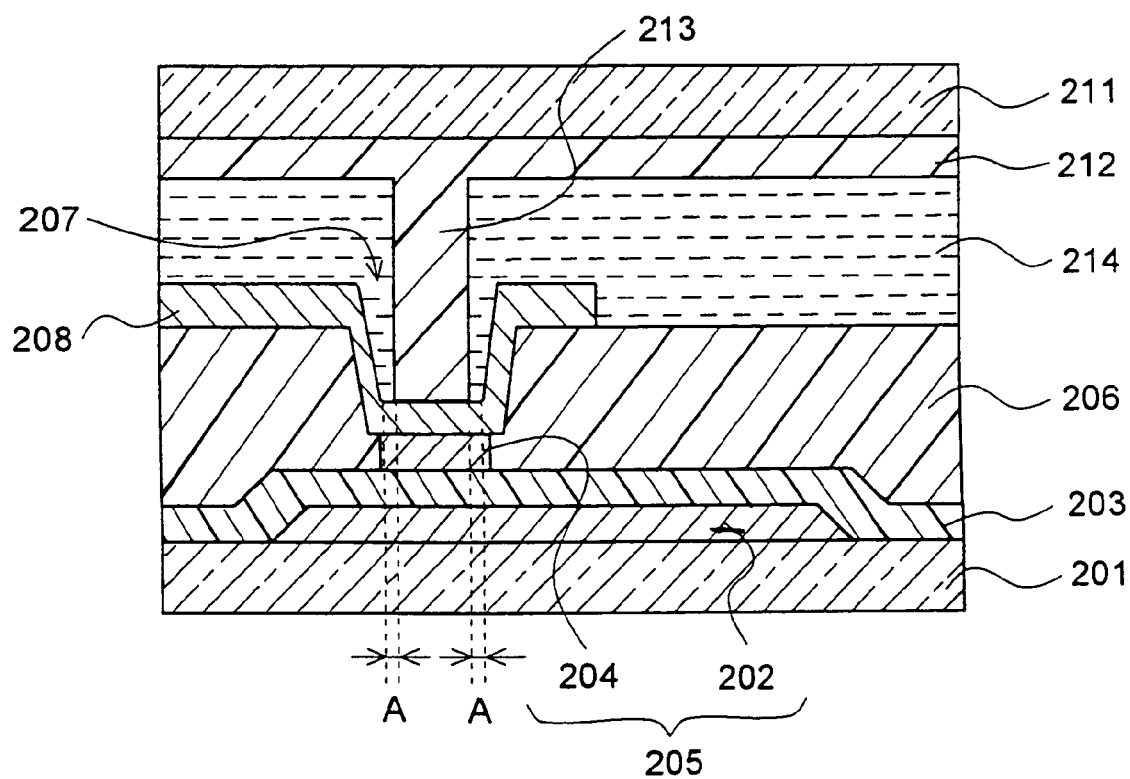
FIG. 17 is a sectional view showing a general configuration of another conventional liquid crystal display apparatus.

According to this embodiment, the transparent layer 24 is arranged on the second substrate 2 different from the first substrate 1 having the reflection electrode 14b, and the reflection electrode 14b is tabular in other than the area having a columnar spacer 25 described later. Therefore, unlike in FIGS. 15 and 16, a taper ineffective region is not generated in the display area. Thus, with the configuration according to this embodiment, the reduction in the light utilization efficiency can be avoided.

The first substrate 1 and the second substrate 2 holding the liquid crystal layer 3 between them are attached to each other through the columnar spacer 25 in such a manner that the orientation films 20, 23 are in opposed relation to each other. As a result, the thickness of the liquid crystal layers 3 in the transmissive region and the reflective region is kept constant by the columnar spacer 25. The orientation films 20, 23 collaborate with each other to orient the liquid crystal layer 3 horizontally, for example.

Next, the columnar spacer 25 is explained in detail.

The columnar spacer 25 is formed on the transparent layer 24 at substantially the same position as the contact hole 19 of the first substrate 1. The columnar spacer 25 is configured of an organic material, an inorganic material or a resist. The candidate materials of the resist include rubber photo resist, cyclized polyisoprene photoresist, i.e. OMR-83 (made by TOKYO OHKA KOGYO CO., LTD.) and CBR-M901 (made by JSR Corporation).

Also, polyimide such as HTPR-1100 (made by Toray Industries, Inc.) exhibits a satisfactory photo-sensitivity and is suitable as a material of the columnar spacer 25. As an alternative, the columnar spacer 25 may be configured of a photosensitive colored resin or RGB or black used in the color filter, positive or negative resist, polysiloxane or polysilane. In the case where the columnar spacer 25 is formed of an inorganic material, $SiO_2$ or the like is suitable.

Also, the columnar spacer 25 may be formed of NN70 (made by JSR Corporation) colored in black by a black pigment. As a result, the columnar spacer 25 is blackened thereby making it possible to suppress the adverse effect which the contact hole 19 and the columnar spacer 25 otherwise might have on the display.

According to this embodiment, the columnar spacer 25 and the contact hole 19 are arranged in the pixel. The columnar spacer 25 is formed in such a manner as to have an area superposed and an area not superposed with the contact hole 19 in the cross section parallel to the substrates (including the first substrate 1 and the second substrate 2). This configuration of the columnar spacer 25 is the greatest feature of this invention. This point is explained with reference to FIGS. 3A and 3B.

Figure 3A:
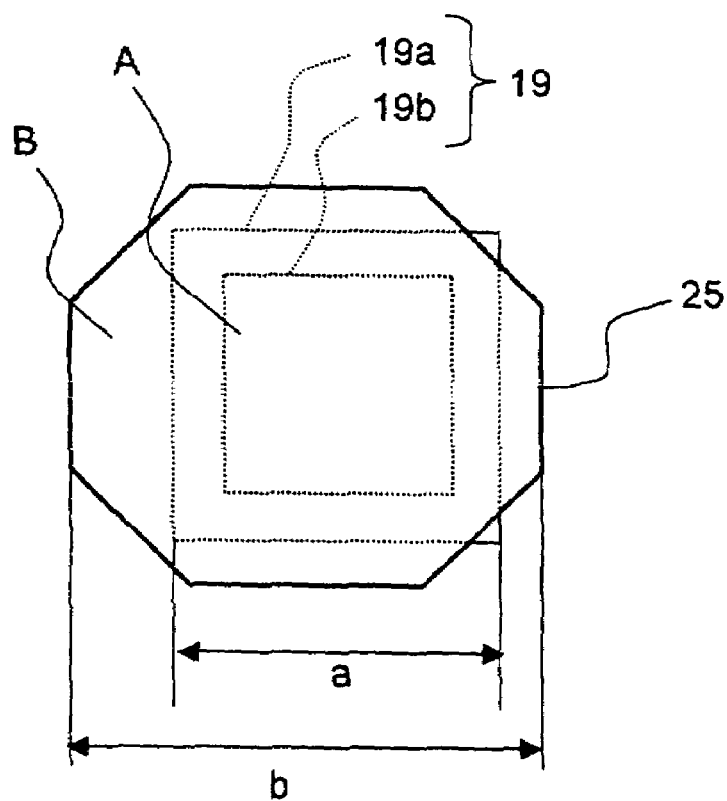
FIG. 3A is a plan view schematically showing an example of the shape and the relative positions of the contact hole and the columnar spacer of the liquid crystal display apparatus.

FIG. 3A is a plan view schematically showing an example of the shape and the relative positions of the contact hole 19 and the columnar spacer 25. The contact hole 19 is formed in a taper along the thickness direction of the substrates to form a square opening 19a. In other words, the width (inner diameter) of the opening 19a of the contact hole 19 is larger than the width (inner diameter) of the bottom portion 19b thereof.

The columnar spacer 25, on the other hand, is configured with an octagonal cross section so that the distance b between the two opposed sides in the cross section of the columnar spacer 25 is at least 2 μm larger than the length a of one side of the opening 19a of the contact hole 19. As a result, a cross section is realized in which the maximum width of the columnar spacer 25 is larger than the maximum width of the opening 19a of the contact hole 19. A part of the columnar spacer 25 located on the opening 19a of the contact hole 19 forms an area A superposed with the contact hole 19, and a part of the columnar spacer 25 located outside the contact hole 19 forms an area B not superposed with the contact hole 19.

Figure 3B:
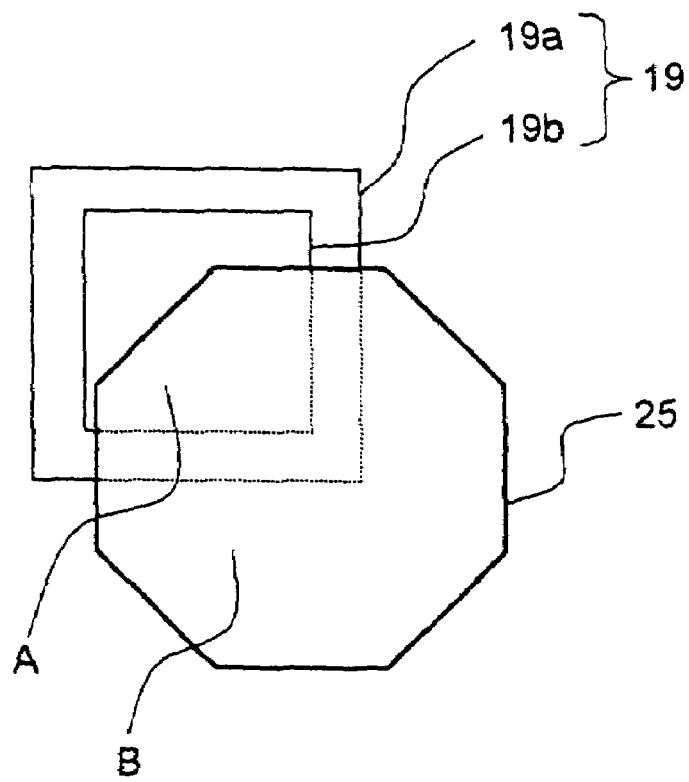
FIG. 3B is a plan view schematically showing the relative positions of the contact hole and the columnar spacer with the substrates displaced from each other.

As described above, the columnar spacer 25 is formed which has the area A superposed with the contact hole 19 and the area B not superposed with the contact hole 19 in the cross section parallel to the substrates. As shown in FIG. 3B, therefore, even in the case where the first substrate 1 and the second substrate 2 are displaced from each other and the columnar spacer 25 fails to completely cover the opening 19a of the contact hole 19, the columnar spacer 25 is prevented from falling in the contact hole 19 due to the constant presence of the area B where the columnar spacer 25 is not superposed with the contact hole 19, thereby making it possible to maintain the desired thickness between the first substrate 1 and the second substrate 2. Even in the case where the first substrate 1 and the second substrate 2 are displaced from each other, therefore, the desired thickness of the liquid crystal layer 3 can be positively maintained, and the liquid crystal display apparatus can be fabricated without losing the production margin in the existing process.

Also, according to this embodiment, a part of the columnar spacer 25 covers at least a part of the opening 19a of the contact hole 19, and the columnar spacer 25 is not arranged in the contact hole 19. In forming the contact hole 19, therefore, unlike in the prior art, the attachment margin taking the displacement of the columnar spacer 25 as granted is not required. As a result, enlargement of an ineffective region not contributing to display is avoided thereby to prevent the reduction in the open area ratio of each pixel while at the same time avoiding the reduction in contrast for improved display quality.

Especially in the case where the columnar spacer 25 is formed with a cross section in such a shape that the maximum width thereof is larger than the maximum width of the opening 19a of the contact hole 19 formed in one substrate (first substrate 1) as described above, the columnar spacer 25 can be positively prevented from falling in the contact hole 19 even when the first substrate 1 and the second substrate 2 attached to each other are displaced from each other. As a result, a cell gap can be positively secured and otherwise the effects of the invention described above can be positively achieved.

Further, in the case where the columnar spacer 25 is configured to have a cross section larger in area than the opening 19a of the contact hole 19, the opening 19a can be completely covered by the columnar spacer 25 even when the first substrate 1 and the second substrate 2 are displaced from each other. Thus, the effects of the invention described above can be produced more positively.

The cross section of the columnar spacer 25 (the cross section in the direction parallel to the second substrate 2) is not limited to the regular octagon described above, but may be any of other anisotropic polygons such as rectangle and triangle, circle and ellipse. Also, the cross section of the contact hole 19 is not limited to the square but may be any of other anisotropic polygons, circle and ellipse.

Thus, the maximum width of the columnar spacer 25 or the maximum width of the opening 19a of the contact hole 19 referred to in this embodiment can be considered to correspond to the maximum length of the diagonal or sides of a polygonal cross section, to the diameter of a circular cross section and the length of the long axis of an elliptic cross section.

An explanation has been made above about a case in which the columnar spacer 25 is configured to have the maximum width larger than the maximum width of the opening 19a of the contact hole 19. Nevertheless, this invention is not limited to this case. In short, the columnar spacer 25 is configured with a cross section parallel to the substrates which has both an area superposed and an area not superposed with the contact hole 19.

Figure 4A:
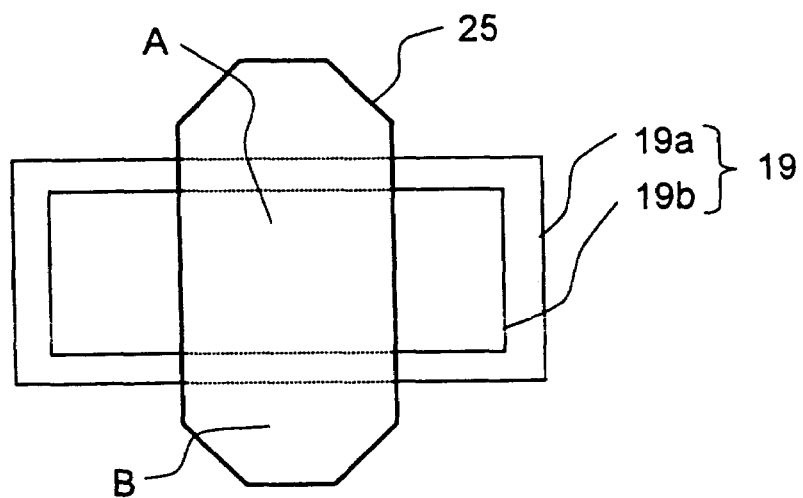
FIG. 4A is a plan view schematically showing another example of the shape and the relative positions of the contact hole and the columnar spacer.
Figure 4B:
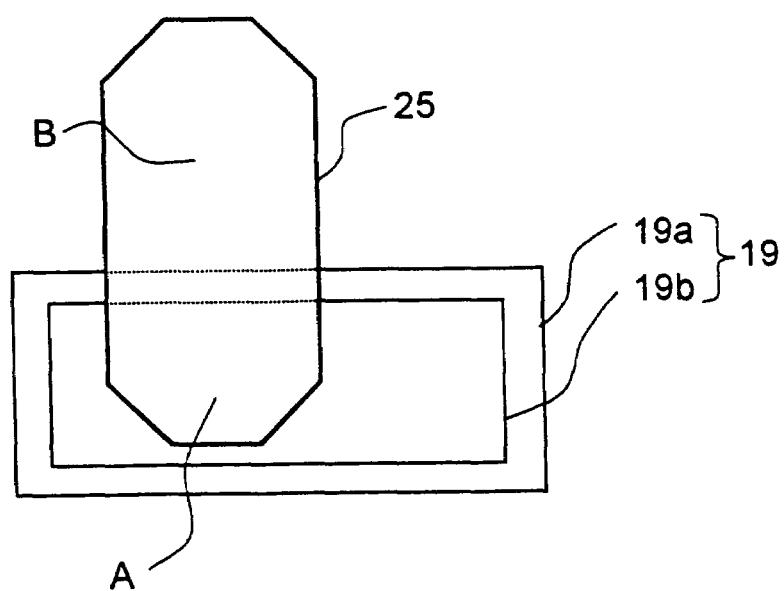
FIG. 4B is a plan view schematically showing the relative positions of the contact hole and the columnar spacer with the substrates displaced from each other.

FIGS. 4A and 4B, for example, are plan views schematically showing an example of the relative positions of the contact hole 19 and the columnar spacer 25 in the case where the maximum width of the columnar spacer 25 is smaller than the maximum width of the opening 19a of the contact hole 19. FIG. 4A shows the case in which the substrates attached to each other are not displaced from each other, and FIG. 4B the case in which the substrates attached to each other are displaced from each other. These cases assume that the direction along the maximum width of the columnar spacer 25 and the direction along the maximum width of the opening 19a of the contact hole 19 are orthogonal to each other.

Even in the case where the columnar spacer 25 is configured as described above, the fact that the columnar spacer 25 has the area A superposed with the contact hole 19 and the area B not superposed with the contact hole 19 in the cross section parallel to the substrates makes it possible to maintain a predetermined interval between the pair of the substrates in the area B of the columnar spacer 25 not superposed with the contact hole 19 in case of displacement which may occur between the substrates attached to each other. Also, the presence of the area B not superposed with the contact hole 19 in the columnar spacer 25 eliminates the case in which the columnar spacer 25 is located in the contact hole 19. Thus, the effects of the invention described above are produced also in this case.

In view of the fact described above, in the liquid crystal display apparatus according to this invention comprising a pair of the substrates (the first substrate 1 and the second substrate 2) holding the liquid crystal layer 3 therebetween and attached to each other through the columnar spacer 25 to display an image with a plurality of pixels, it can be said that the columnar spacer 25 may be formed in such a manner that a part thereof is superposed, in each pixel, with at least a part of the contact hole 19 formed in one substrate (first substrate 1).

A configuration, in which the columnar spacer 25 has an area superposed with a part of the contact hole 19 in the cross section thereof, i.e. a configuration in which the area (area A) of the columnar spacer 25 superposed with the contact hole 19 is superposed with a part of the contact hole 19, is described in detail later with reference to the third embodiment.

Taking into consideration that the orientation film 23 of the second substrate 2 is rubbed, the columnar spacer 25 is desirably arranged in such a position that the direction in which the second substrate 2 is rubbed is at right angles to the direction along the minimum width of the columnar spacer 25. The reason is described below.

Figure 5A:
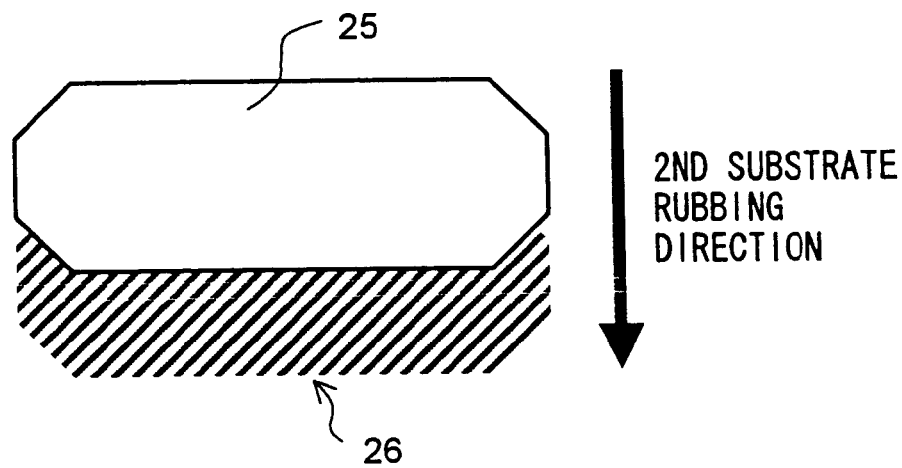
FIG. 5A is a plan view of the columnar spacer arranged with the long side thereof arranged at right angles to the direction in which one of the substrates is rubbed.
Figure 5B:
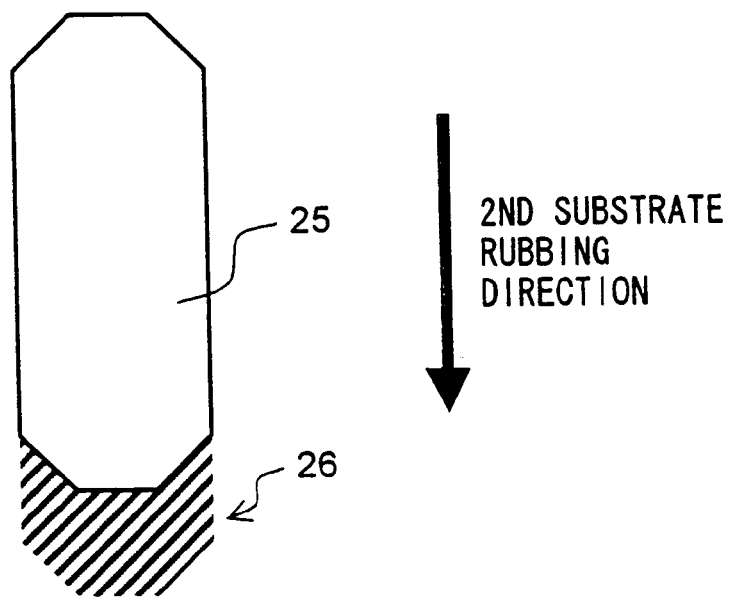
FIG. 5B is a plan view of the columnar spacer arranged with the short side thereof arranged at right angles to the rubbing direction.

FIGS. 5A and 5B are plan views schematically showing the relation between the direction in which the second substrate 2 is rubbed and the position where the columnar spacer 25 is arranged. Specifically, FIG. 5A shows the case in which the columnar spacer 25 is arranged with the long side thereof at right angles to the rubbing direction, and FIG. 5B the case in which the columnar spacer 25 is arranged with the short side thereof at right angles to the rubbing direction.

Generally, in the case where the orientation film 23 is rubbed after forming the columnar spacer 25, since the rubbing cloth fails to touch the orientation film 23 due to the presence of the columnar spacer 25, the rubbing shadow 26 with no liquid crystal oriented is formed downstream of the columnar spacer 25 in the rubbing operation, as shown in FIGS. 5A and 5B.

As shown in FIG. 5B, therefore, the columnar spacer 25 is arranged in such a position that the direction in which the second substrate 2 is rubbed is at right angles to the direction along the minimum width (short side) of the columnar spacer 25. In the case where the sectional area of the columnar spacer 25 is constant, the projection area of the rubbing shadow 26 caused by the columnar spacer 25 can be reduced as compared with the other methods of arrangement. The degradation in display performance can thus be reduced.

Taking this reduction in projection area into consideration, the cross section of the columnar spacer 25 is desirably a polygon (an octagon or a rectangle such as shown in FIGS. 5A, 5B) having a long side parallel to the rubbing direction and a short side perpendicular to the rubbing direction or an ellipse or the like having the long axis parallel to the rubbing direction and the short axis perpendicular to the rubbing direction.

The liquid crystal display apparatus can be fabricated without rubbing the substrates by configuring the liquid crystal layer 3 of a material having a vertical alignment. Specifically, a liquid crystal display apparatus can be configured in which a pair of substrates (the first substrate 1 and the second substrate 2) are attached to each other without being rubbed. Also by employing this configuration, the orientation defect which otherwise might be caused by the rubbing process is not developed, and therefore the problem of degradation in display performance described above can be solved.

Figure 6A:
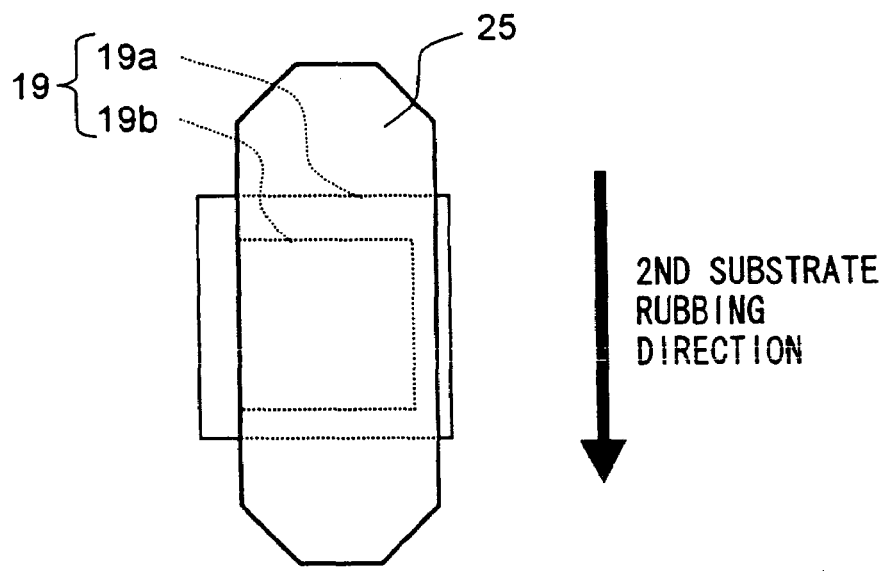
FIG. 6A is a plan view schematically showing still another example of the shape and the relative positions of the contact hole and the columnar spacer.
Figure 6B:
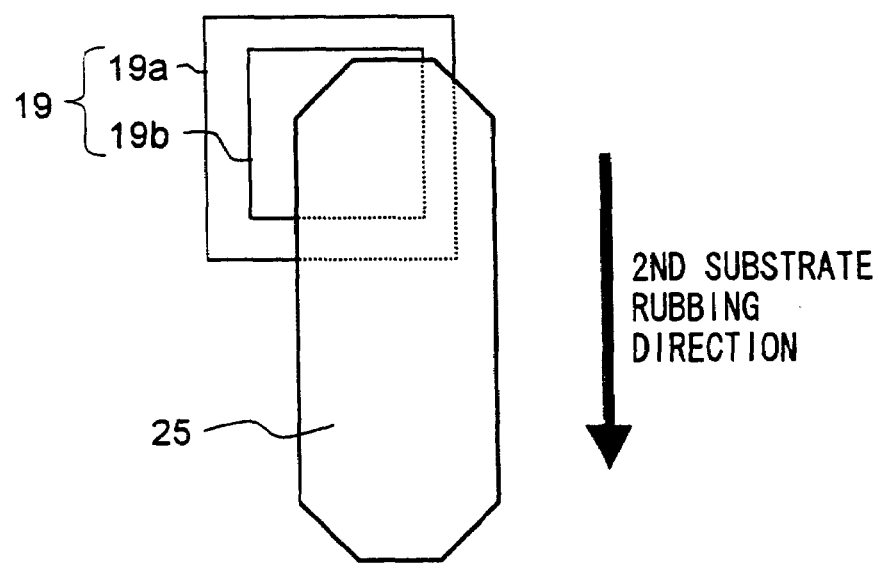
FIG. 6B is a plan view schematically showing the relative positions of the contact hole and the columnar spacer with the substrates displaced from each other.

FIGS. 6A and 6B are plan views schematically showing another example of the shape and the relative positions of the contact hole 19 and the columnar spacer 25. As shown in FIG. 6A, the opening 19a of the contact hole 19 is a square as shown in the case of FIGS. 3A and 3B. The columnar spacer 25, however, has a octagonal (but not regular octagonal) cross section with a long side in the direction in which the second substrate 2 is rubbed and the short side at right angles to the rubbing direction.

The columnar spacer 25 desirably has a maximum width in the rubbing direction, and the width is 2 μm or more larger than the width of the opening 19a of the contact hole 19 in the rubbing direction. In this case, as shown in FIG. 6B, an area where the columnar spacer 25 is not superposed with the contact hole 19 can always be secured even in the case where the substrates attached to each other are displaced from each other. At the same time, the projection area of the rubbing shadow 26 attributable to the columnar spacer 25 at the time of rubbing can be reduced more positively than in the case where the columnar spacer 25 is arranged with the long side thereof at right angles to the rubbing direction. In other words, even in the case where the substrates are displaced from each other, a predetermined cell gap can be secured while at the same time avoiding the reduction in display quality.

Also, the columnar spacer 25 desirably has a minimum width in a direction at a right angle to the rubbing direction, and the width is 2 μm or more smaller than the width of the opening 19a of the contact hole 19 in the direction at a right angle to the rubbing direction. In this case, the liquid crystal can enter and positively fill up the contact hole 19 through the opening 19a of the contact hole 19. Therefore, the light leakage which otherwise might be caused through the liquid crystal bubble area is prevented.

Figure 7:
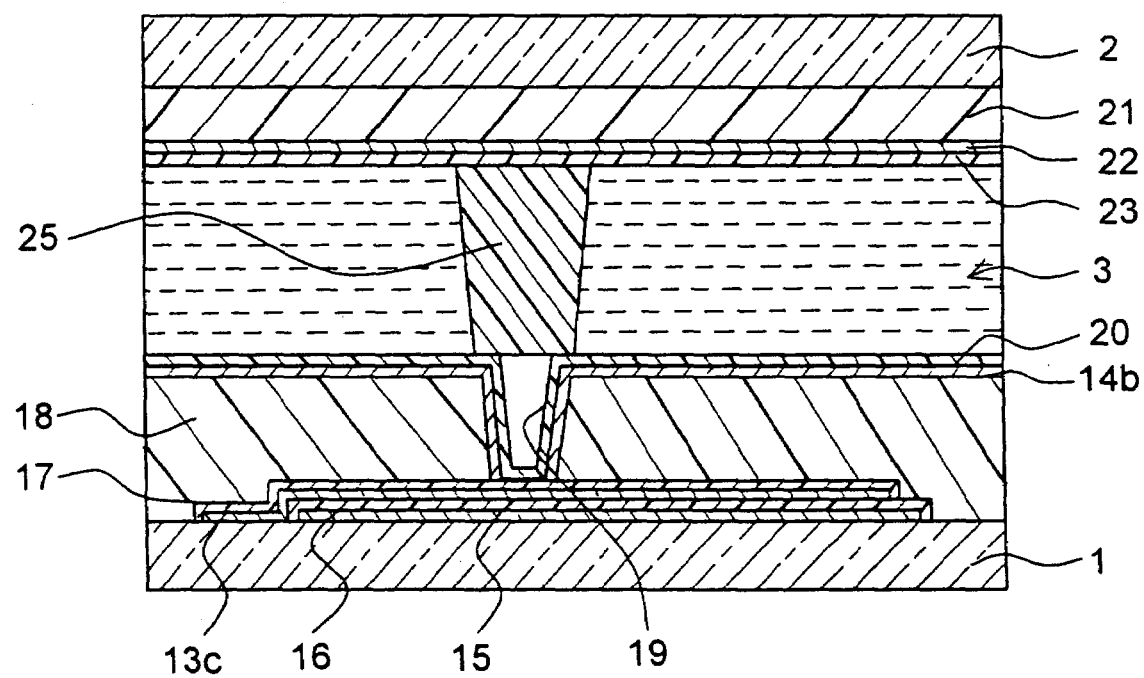
FIG. 7 is a sectional view showing a general configuration of a reflection-type liquid crystal display apparatus.

According to this embodiment, the contact hole 19 is formed in the reflective region, and the columnar spacer 25 corresponding to the contact hole 19 is formed in the reflective region. In the liquid crystal display apparatus of reflection type or transmission/reflection type having a reflective region, therefore, the above-mentioned effects of the invention can be produced. In other words, the configuration according to this embodiment is applicable not only to the transmission/reflection-type liquid crystal display apparatus shown in FIG. 1 but also to the reflection-type liquid crystal display apparatus as shown in FIG. 7. Thus, similar effects can be produced.

Specifically, the invention can be said to be applicable to a liquid crystal display apparatus, wherein one (first substrate 1) of the pair of substrates holding the liquid crystal layer 3 therebetween includes a plurality of source bus lines 11, gate bus lines 12, TFTs 13 as switching elements and pixel electrodes 14 through an inter-layer insulating film 18 in the layer above at least a part of the switching elements, wherein each pixel electrode 14 includes the reflection electrode 14b, and the contact hole 19 is formed in such a manner as to electrically connect the reflection electrode 14b and the drain electrode 13c of the switching element.

The configuration according to this embodiment is also applicable to the columnar spacer of the transmission-type liquid crystal display apparatus including the contact hole and the columnar spacer in which the pixel electrode is formed of a transparent electrode alone. This configuration is described in more detail with reference to the second embodiment later.

Also, unlike in this embodiment employing three-terminal element such as the TFT 13, this invention is of course applicable to the apparatus including a two-terminal element such as MIM (metal insulator metal).

In the liquid crystal display apparatus according to this invention, one of the substrates (the first substrate 1) has arranged thereon a plurality of electrical wirings and switching elements (TFTs 13 or MIMs) for supplying a voltage to the pixels, the inter-layer insulating film 18 covering at least a part of the switching elements and the pixel electrodes 14 included in the layer above at least a part of the inter-layer insulating film 18, wherein the contact hole 19 is formed in such a manner that the pixel electrode 14 and a lead electrode (the drain electrode, for example) of the switching element are connected electrically to each other.

Also, the columnar spacer 25 may be arranged either in every one or a part of the pixels in the display area of the liquid crystal display apparatus. Specifically, some of the pixels in the display area may not include the columnar spacer 25. In other words, the columnar spacer 25 is formed in at least one pixel in the display area.

The liquid crystal display apparatus according to the invention described above may be alternatively implemented as described below.

According to this invention, there is provided a liquid crystal display apparatus comprising a pair of substrates holding a liquid crystal layer therebetween and attached to each other through a columnar spacer to display an image through a plurality of pixels, wherein each pixel has arranged therein the columnar spacer and a contact hole, and the columnar spacer has both an area superposed with the contact hole and an area not superposed with the contact hole in the cross section thereof parallel to the substrates.

The liquid crystal display apparatus according to the invention comprises a first substrate including a plurality of gate wirings, source wirings and switching elements, pixel electrodes arranged in the layer above the switching elements through an insulating layer, a reflection layer (reflection electrode) formed on the pixel electrodes and drain electrodes electrically connected to the pixel electrodes, a second substrate formed with an opposite electrode, and a liquid crystal layer held between the first and second substrates, wherein the diameter of the columnar spacer for maintaining the interval between the first substrate and the second substrate is larger than the inner diameter of the contact hole and a part of the columnar spacer and a part of the contact hole are superposed with each other.

The liquid crystal display apparatus according to this invention described above is so configured that the contact hole is covered with the columnar spacer.

The liquid crystal display apparatus according to this invention described above is so configured that the diameter of the columnar spacer is at least 2 μm larger than the inner diameter of the upper portion of the contact hole.

The liquid crystal display apparatus according to this invention described above is so configured that the long side of the columnar spacer having an anisotropic cross section is set in parallel to the direction in which the substrate including the columnar spacer is rubbed, wherein the length of the particular long side is at least 2 μm larger than the inner diameter of the upper portion of the contact hole in the direction parallel to the rubbing direction.

The liquid crystal display apparatus according to this invention described above is so configured that the length of the short side of the columnar spacer perpendicular to the direction in which the substrate having the columnar spacer is rubbed in the substrate plane is at least 2 μm smaller than the inner diameter of the upper portion of the contact hole perpendicular to the rubbing direction.

Embodiments 2

Another embodiment of the invention is explained with reference to the drawings. The same component parts as those in the first embodiment are designated by the same reference numerals, respectively, and not described any more.

This embodiment is configured the same way as the first embodiment except that the liquid crystal display apparatus is of transmission type. Specifically, according to this embodiment, the configuration of the columnar spacer 25 according to the first embodiment is used for the transmission-type liquid crystal display apparatus. The transmission-type liquid crystal display apparatus according to this embodiment is described below.

Figure 8:
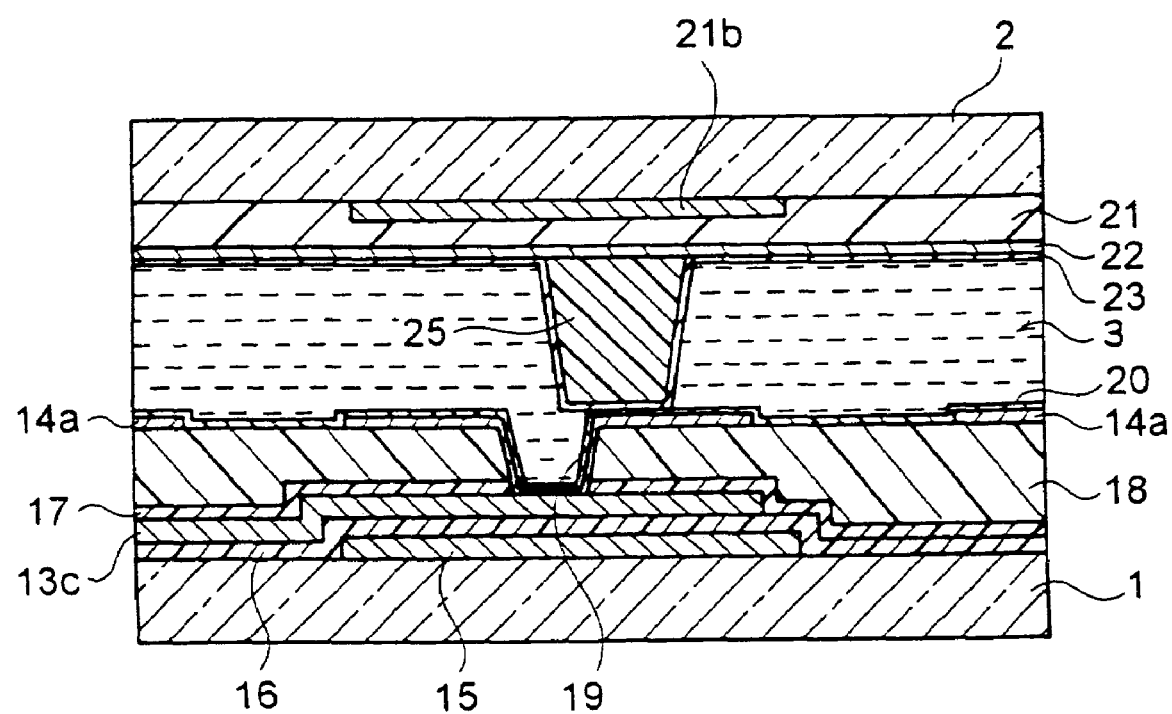
FIG. 8 is a sectional view showing a general configuration of a transmission-type liquid crystal display apparatus according to another embodiment of the invention.
Figure 9:
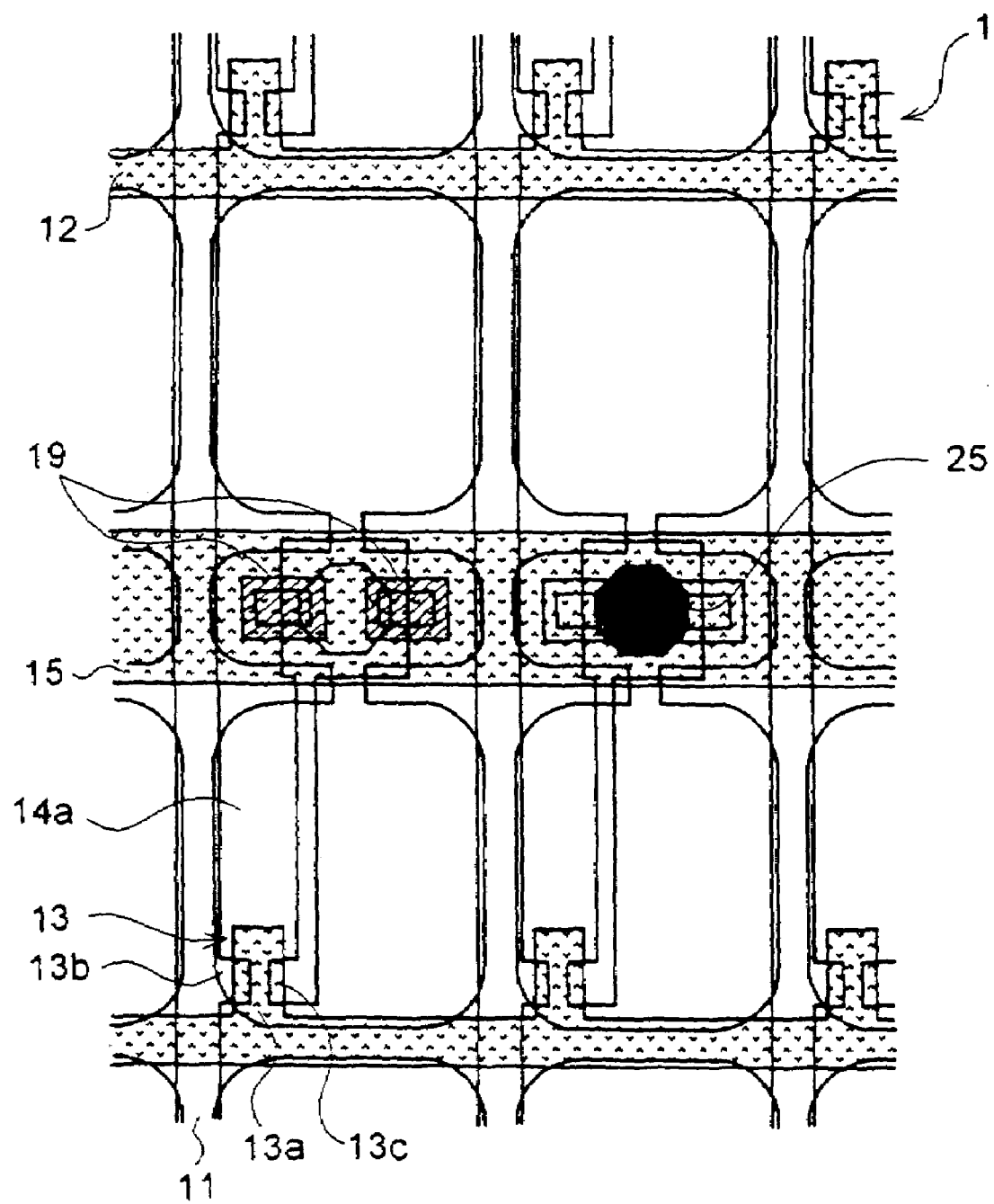
FIG. 9 is a plan view of one of the substrates making up the above-mentioned liquid crystal display apparatus.

FIG. 8 is a sectional view showing a general configuration of the liquid crystal display apparatus according to this embodiment, and FIG. 9 is a plan view showing the first substrate 1 of the liquid crystal display apparatus. In the liquid crystal display apparatus according to this embodiment, the liquid crystal layer 3 is held between a pair of substrates including the first substrate 1 and the second substrate 2.

The first substrate 1 is configured of an insulating transparent substrate (such as a glass substrate) and has the surface thereof formed with a plurality of source bus lines 11 and a plurality of gate bus lines 12 in orthogonal arrangement as shown in FIG. 9. The portion defined by adjacent source bus lines 11 and gate bus lines 12 constitutes one pixel. The pixels are thus arranged in matrix. The source bus lines 11 and the gate bus lines 12 function as electrical wires for supplying a voltage to each pixel.

At each intersection between the source bus lines 11 and the gate bus lines 12, the TFT 13 is arranged as an active switching element for switching on/off the corresponding pixel. The gate electrode 13a of the TFT 13 is connected to the corresponding gate bus line 12, the source electrode 13b to the corresponding source bus line 11, and the drain electrode 13c to the corresponding transparent electrode 14a constituting a pixel electrode. The first substrate 1 has formed thereon the auxiliary capacitance electrode (auxiliary capacitance wiring) 15, and the gate insulating film 16 is formed in such a manner as to cover the auxiliary capacitance electrode 15.

Unlike in this embodiment having the auxiliary capacitance electrode 15 as an independent component part, the gate bus line 12 may be used as an auxiliary capacitance wire.

Each transparent electrode 14a is configured of a transparent conductive film of ITO, for example. The provision of the transparent electrode 14a makes it possible to form a transmissive region for transmission-type display in the pixel. The inter-layer insulating films 17, 18 are stacked in this order on the drain electrode 13c, and the transparent electrode 14a is formed on the surface of the inter-layer insulating film 18. In other words, the inter-layer insulating film 18 covers at least a part of the TFT 13 and the transparent electrode 14a is arranged in the layer above at least a part of the inter-layer insulating film 18.

The first substrate 1 is formed with a plurality of contact holes 19 each for electrically connecting the transparent electrode 14a and the drain electrode 13c. The orientation film 20 is formed on the liquid crystal layer 3 side of the transparent electrode 14a.

The second substrate 2 is configured of an insulating transparent substrate (such as a glass substrate), and has the surface thereof stacked with the colored layer 21 as a color filter, a light shielding film 21b, the opposite electrode 22 of such material as an ITO and the orientation film 23.

The colored layer 21 is formed in such a manner as to cover the light shielding film 21b in line with the pixel formed in the portion where the opposite electrode 22 and the transparent electrode 14a are in opposed relation to each other. The light shielding film 21b may be arranged as required and may be omitted. Also, the light shielding film 21b may be stacked on the colored layer 21.

The first substrate 1 and the second substrate 2 holding the liquid crystal layer 3 between them are attached to each other through a columnar spacer 25 in such a position that the orientation films 20, 23 are opposed to each other. As a result, the thickness of the liquid crystal layer 3 is kept constant by the columnar spacer 25.

The columnar spacer 25 is formed on the colored layer 21 of the second substrate 2 with a cross section in the shape of regular octagon at a position equivalently on the auxiliary capacitance electrode 15 of the first substrate 1. Also, the columnar spacer 25 is formed on the second substrate 2 in superposition with a part of each of a plurality of the contact holes 19. As for the order in which the columnar spacer 25 and the orientation film 23 are stacked, as shown in FIG. 8, the orientation film 23 may be formed on the columnar spacer 25 or the columnar spacer 25 may be formed on the orientation film 23. In all the embodiments of the invention, the orientation film 23 and the columnar spacer 25 may be stacked one on the other in the desired order.

The area formed with the auxiliary capacitance electrode 15 fails to contribute to the display of transmission type. According to this embodiment, therefore, the deterioration of display quality which otherwise might be caused by the arrangement of the columnar spacer 25 can be avoided by arranging the columnar spacer 25 on the auxiliary capacitance electrode 15. Also, the arrangement of a new light shielding pattern is not required for avoiding the deterioration of the display quality due to the columnar spacer 25, thereby making it possible to avoid the reduction in the open area ratio of each pixel.

Embodiment 3

Still another embodiment of the invention is explained below with reference to the drawings. The same component parts of the third embodiment as those in the first or second embodiment are designated by the same reference numerals, respectively, and not described again.

Figure 10:
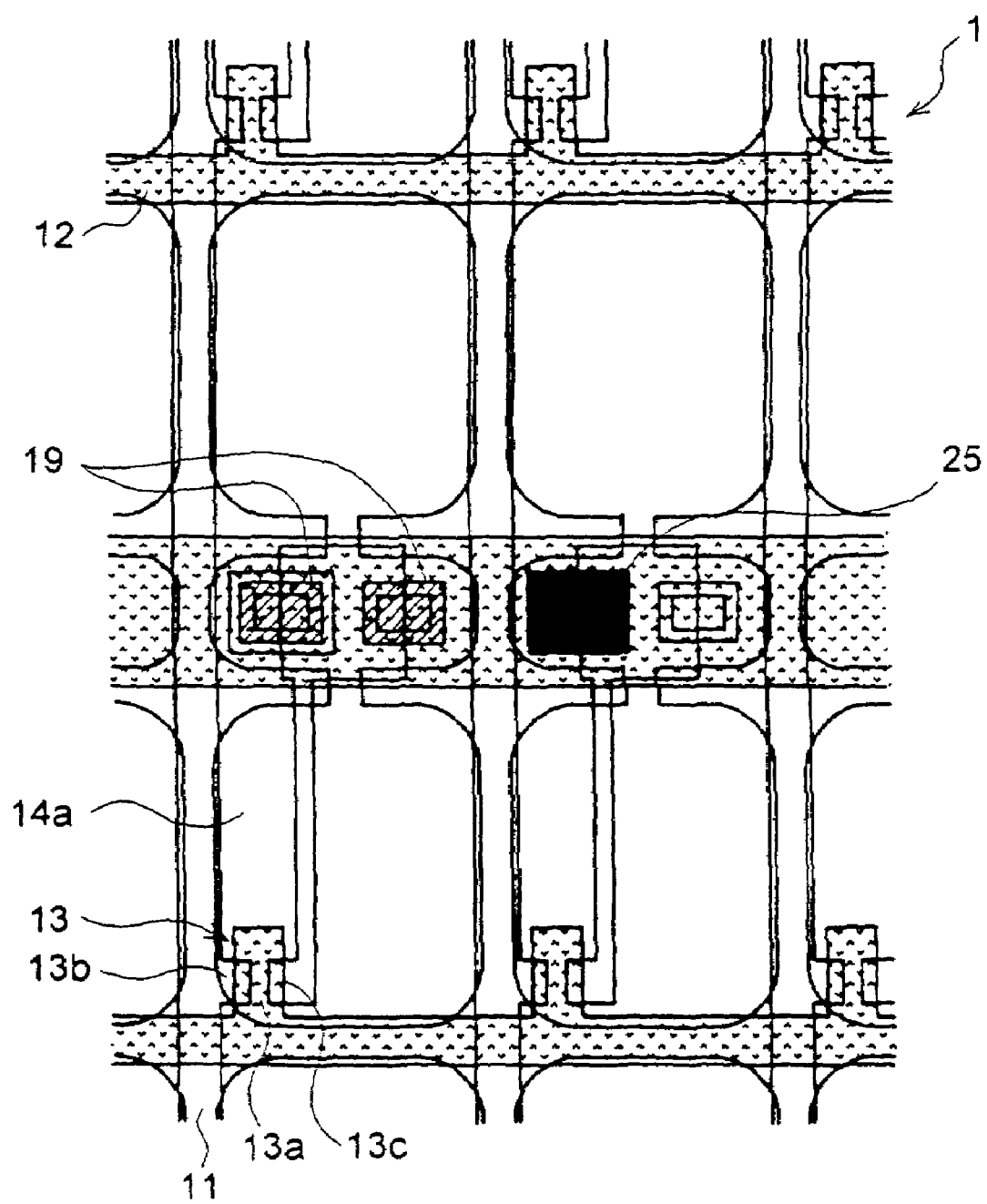
FIG. 10 is a plan view of one of the substrates making up the liquid crystal display apparatus arranged in such a manner that the columnar spacer covers the opening of each contact hole.

FIG. 10 is a plan view showing the first substrate 1 of a transmission-type liquid crystal display apparatus according to the second embodiment, in which the columnar spacer 25 having a rectangular cross section much larger in area than the opening of the contact hole 19 is arranged in such a manner as to cover the particular opening. The contact hole 19, in plan view, is a rectangle of 14 µm by 18 µm having an opening area of 14×18=252 µm$^2$.

Generally, the sectional area (the area grounded with the substrates) of the columnar spacer 25 required to hold the thickness of the liquid crystal layer 3, depending on the material of the columnar spacer 25 and the thickness of the liquid crystal layer 3, is considered to be 185 µm$^2$ according to this embodiment. In this case, the configuration shown in FIG. 10 can secure 437(=252+185) µm$^2$ as a sectional area of the columnar spacer 25.

In the case where the sectional area of the columnar spacer 25 is excessively large, on the other hand, the friction force between the columnar spacer 25 and the first substrate 1 or the second substrate 2 is increased when the first substrate 1 constituting a TFT and the second substrate 2 constituting a CF substrate are attached to each other, thereby sometimes making difficult the fine adjustment in the process of positioning the two substrates. The sectional area of the columnar spacer 25, therefore, is not desirably increased unnecessarily.

According to this embodiment, the columnar spacer 25 is configured in such a manner that the area of the columnar spacer 25 superposed with the contact hole 19 is not the whole but a part of the contact hole 19 to avoid the inconveniences described above. A detailed explanation about this point is made below with reference to first to third examples.

In the first to third examples, the transmission-type liquid crystal display apparatus described in the second embodiment above is referred to. Nevertheless, the configuration described below can of course be employed for the liquid crystal display apparatus of transmission/reflection type or reflection type explained in the first embodiment above with equal effect. Also, in the first to third examples, the contact hole 19 is configured of a rectangle 14 µm by 18 µm in size in plan view (opening area of 252 µm$^2$).

FIRST EXAMPLE

Figure 11:
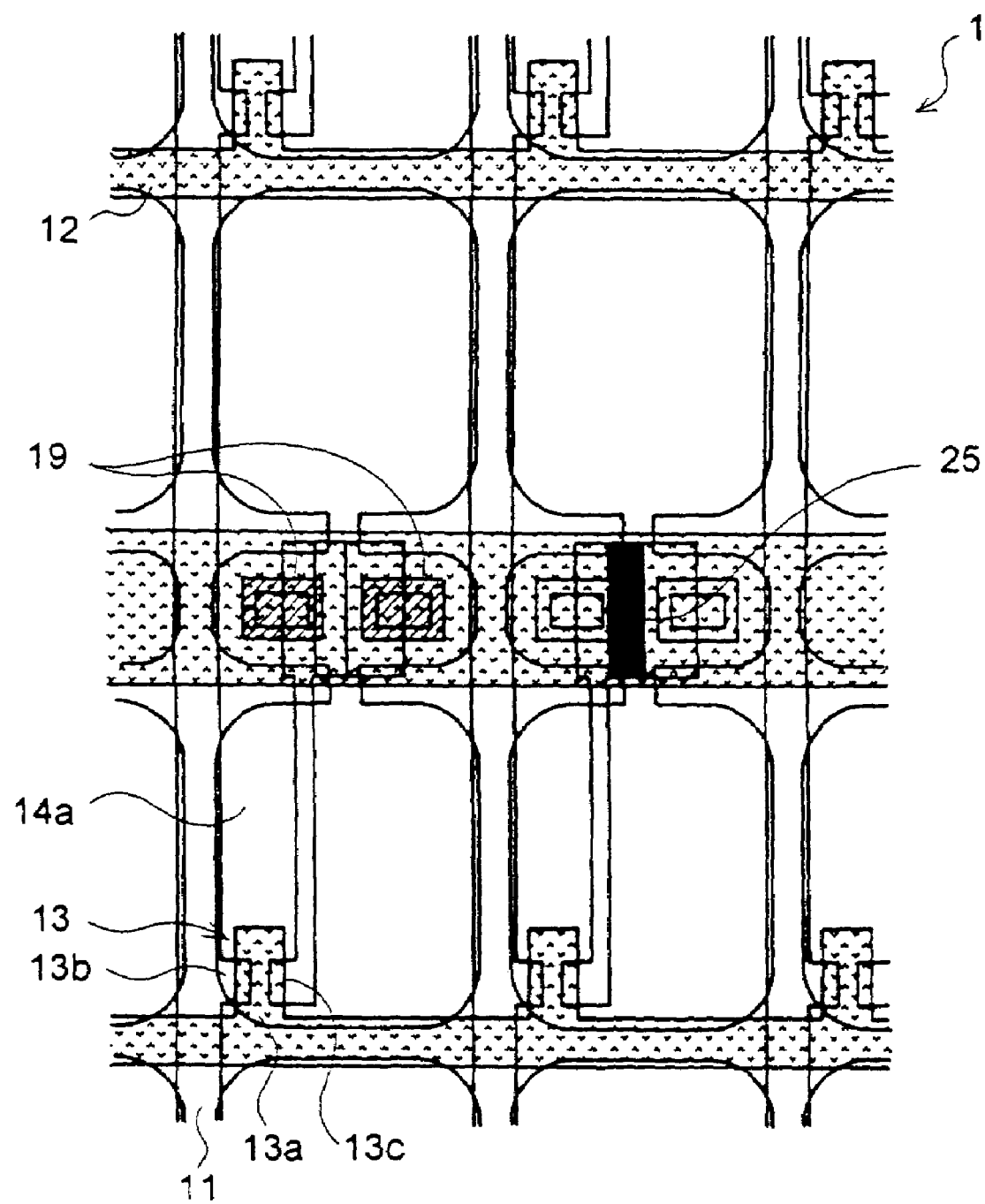
FIG. 11 is a plan view showing one of the substrates making up the liquid crystal display apparatus according to one example of still another embodiment of the invention.

FIG. 11 is a plan view showing the first substrate 1 of the liquid crystal display apparatus according to this example. In this example, the columnar spacer 25 has a rectangular cross section in the size of 30 µm by 7 µm (sectional area of 210 µm$^2$) and is arranged in superposition with a part of the contact hole 19.

In this example, each columnar spacer 25 is formed on the side of the first substrate 1 formed with the TFT 13. Even in the case where the first substrate 1 and the second substrate 2 attached to each other are displaced from each other, therefore, the position of the columnar spacer 25 relative to the contact hole 19 remains unchanged. In this example, therefore, unlike in the second and third examples described later, the displacement (5 µm) between the substrates attached to each other is not taken into consideration.

In this example, the sectional area of the columnar spacer 25 is 210 µm$^2$, which is larger than the grounding area 185 µm$^2$ of the columnar spacer 25 required to hold the thickness of the liquid crystal layer 3. By employing a configuration in which the columnar spacer 25 is superposed not with the whole but with a part of the contact hole 19 as in this example, the sectional area (210 µm$^2$) of the columnar spacer 25 much smaller than in the case of FIG. 10 (437 µm$^2$) can be realized while at the same time securing the required grounding area of 185 µm$^2$. As a result, the increase in the friction force between the columnar spacer 25 and the second substrate 2 is suppressed thereby to facilitate the fine adjustment in the process of positioning the substrates.

In the case of FIG. 10 where the columnar spacer 25 is superposed with the whole of the contact hole 19, the shape, size and the position of the columnar spacer 25 are limited by the shape, size and the position, respectively, of the contact hole 19. In the case where the columnar spacer 25 is formed in superposition with a part of the contact hole 19 as in this example, however, such a limitation is not imposed and the freedom increased. Thus, the reduction in the open area ratio is suppressed and the orientation irregularities of the liquid crystal is reduced.

SECOND EXAMPLE

According to this example, in the configuration shown in FIG. 9 (second embodiment) with the columnar spacer 25 arranged on the side of the second substrate 2, the columnar spacer 25 has a cross section in the shape of an octagon circumscribed about the circle having a radius of 10 µm. For the reason of fabricating a mask to produce the columnar spacer 25, the cross section of the columnar spacer 25 according to this example is not a regular octagon. More specifically, in the cross section of the columnar spacer 25, each the four alternate sides of the eight sides making up the octagon has the length of, say, 8 µm, while the remaining four sides (four sides located between each pair of 8-µm sides) each have the length of, say, 8.4 µm. According to this example, therefore, the sectional area of the columnar spacer 25 is given as $(8 \times 10 \times 4)/2 + (8.4 \times 10 \times 4)/2 = 328$ µm$^2$.

The columnar spacer 25 having an octagonal cross section as in this example is designed, for example, to have a sectional area of 328 µm$^2$ as described above. Then, it is known that the grounding area of 185 µm$^2$ required of the columnar spacer 25 to hold the thickness of the liquid crystal layer 3 can be secured even in the case where the first substrate 1 and the second substrate 2 attached to each other are displaced from each other by 5 µm in both vertically and horizontally at the same time.

By employing the configuration in which the columnar spacer 25 is superposed with a part of the contact holes 19 as in this example, therefore, the required grounding area of 185 µm$^2$ is secured while at the same time realizing a much smaller sectional area (328 µm$^2$) of the columnar spacer 25 than in the case of FIG. 10 (437 µm$^2$) even in the case where the substrates are displaced from each other (by 5 µm both vertically and horizontally, for example). Even after taking the substrate displacement into consideration, therefore, the substrates can be set in relative positions easily by reducing the friction force between the columnar spacer 25 and the first substrate 1. In this way, similar effects to the first example can be produced.

THIRD EXAMPLE

Figure 12:
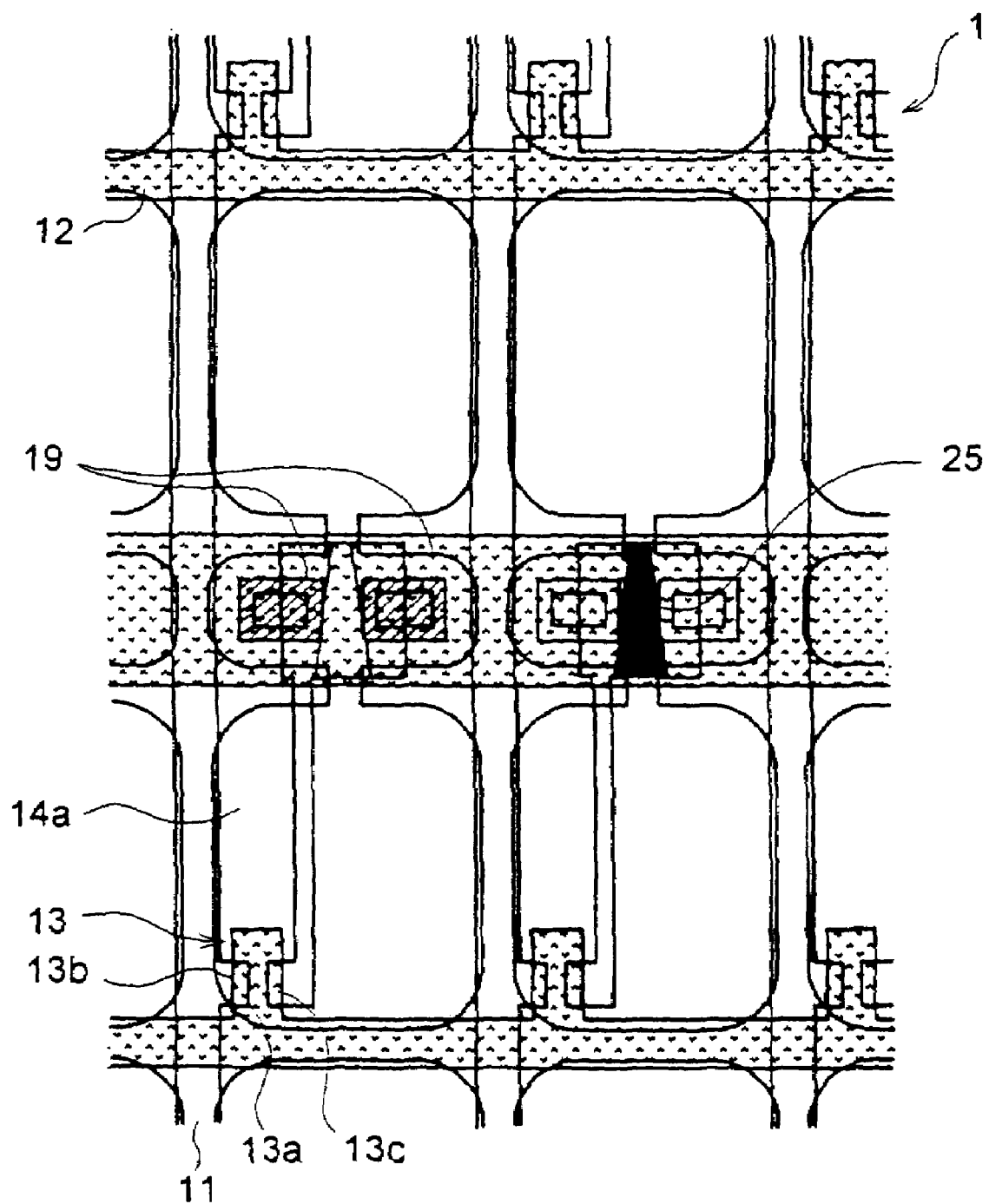
FIG. 12 is a plan view of one of the substrates making up the liquid crystal display apparatus according to another example of the invention.

FIG. 12 is a plan view showing the first substrate 1 of the liquid crystal display apparatus according to this example. In this example, the columnar spacer 25 has a trapezoidal cross section. This trapezoid has, for example, the upper side 4 µm long, the lower side 12 µm long, the height of 31 µm and the area of 248 µm$^2$. The columnar spacer 25 is formed on the side of the second substrate 2 in superposition with a part of the contact holes 19.

Various calculations show that in the case where the columnar spacer 25 has a trapezoidal cross section of the size described above and the substrates attached to each other are displaced horizontally by 5 µm, for example, the grounding area of 185 µm$^2$ can be maintained in the absence of vertical displacement. It is also known from various calculations that in the case where the substrates are displaced vertically by 5 µm and horizontally by not more than 4.3 µm, for example, the grounding area of 185 µm$^2$ can be maintained.

By employing the configuration in which the columnar spacer 25 is superposed with a part of the contact holes 19 as in this example, therefore, the required grounding area of 185 µm$^2$ can be secured while at the same time realizing a much smaller sectional area (328 µm$^2$) of the columnar spacer 25 than in the case of FIG. 10 (437 µm$^2$) even in the case where the substrates are displaced (say, 5 µm vertically or horizontally). As a result, even after considering the substrate displacement, the friction force between the columnar spacer 25 and the first substrate 1 can be reduced to facilitate the positioning of the substrates. Thus, similar effects to the first example are produced.

As described above, according to the second and third examples, the columnar spacer 25 is formed on the second substrate 2 in such a (sectional) size as to be superposed with a part of each of a plurality of contact holes 19, i.e. in such a manner that the area of the columnar spacer 25 superposed with the contact holes 19 represents a part of each of the plurality of the contact holes 19. In this way, the variations in the grounding area can be reduced upon occurrence of the substrate displacement. This point is explained below with reference to the second example.

Figure 13A:
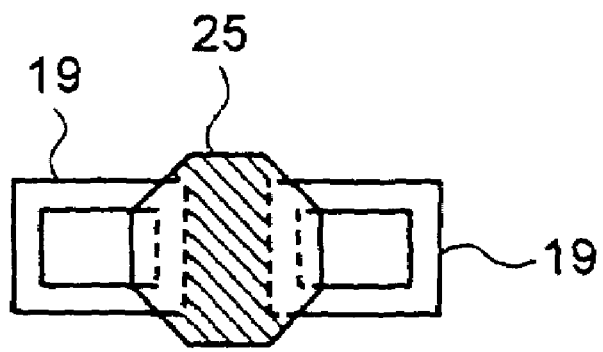
FIG. 13A is a schematic diagram for explaining the relative positions of the columnar spacer and a plurality of contact holes in the case where the columnar spacer is formed in such a size as to be superposed with a part of each of the plurality of the contact holes and the substrates attached to each other are not displaced from each other.
Figure 13B:
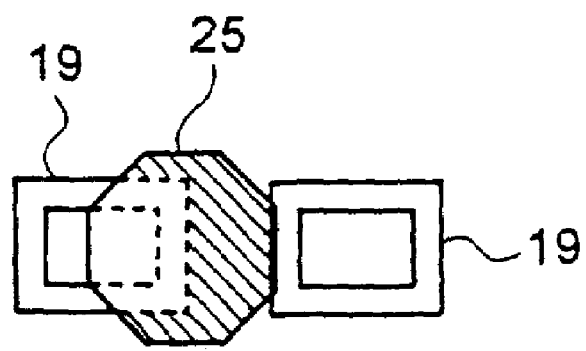
FIG. 13B is a schematic diagram for explaining the relative positions of the columnar spacer and a plurality of contact holes in the case where the columnar spacer is formed in such a size as to be superposed with a part of each of the plurality of the contact holes and the substrates attached to each other are displaced from each other.
Figure 13C:
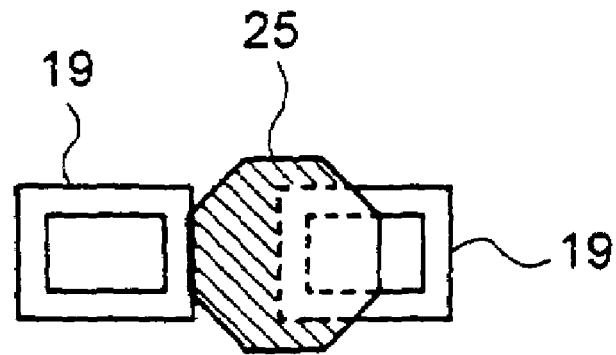
FIG. 13C is a schematic diagram for explaining the relative positions of the columnar spacer and a plurality of contact holes in the case where the columnar spacer is formed in such a size as to be superposed with a part of each of the plurality of the contact holes and the substrates attached to each other are displaced from each other.

FIGS. 13A to 13C schematically show the relative positions of the columnar spacer 25 and a plurality of the contact holes 19 in the case where the columnar spacer 25 is formed in such a size as to be superposed with a part of each of the contact holes 19. The hatched portion represents the grounding area of the columnar spacer 25 and the first substrate 1. As shown in FIG. 13A, assuming that the columnar spacer 25 is superposed equally with a part of each of the two contact holes 19 (without any substrate displacement), the grounding area of the columnar spacer 25 and the first substrate 1 (the area of the hatched portion) is 192.00 µm$^2$, for example.

Next, in the case where the second substrate 2 is displaced by 5 µm in one direction (leftward, for example) with respect to the first substrate 1 as shown in FIG. 13B, the grounding area is reduced to 185.75 µm$^2$. Also in the case where the second substrate 2 is displaced by 5 µm in the opposite direction (rightward) with respect to the first substrate 1 as shown in FIG. 13C, on the other hand, the grounding area is reduced to 185.75 µm$^2$.

As described above, in the case where the columnar spacer 25 is formed in such a size as to be superposed with a part of each of a plurality of the contact holes 19, the grounding area is varied in a maximum range of 6.25 µm$^2$ between 185.75 µm$^2$ and 192.00 µm$^2$.

Figure 14A:
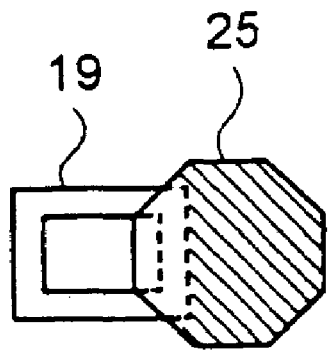
FIG. 14A is a schematic diagram for explaining the relative positions of the columnar spacer and a single contact hole in the case where the columnar spacer is formed in such a size as to be superposed with a part of the single contact hole and the substrates attached to each other are not displaced from each other.
Figure 14B:
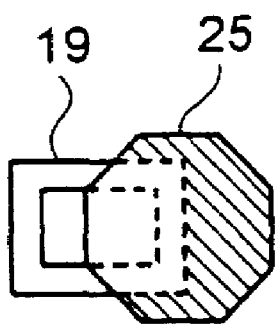
FIG. 14B is a schematic diagram for explaining the relative positions of the columnar spacer and a single contact hole in the case where the columnar spacer is formed in such a size as to be superposed with a part of the single contact hole and the substrates attached to each other are displaced from each other.
Figure 14C:
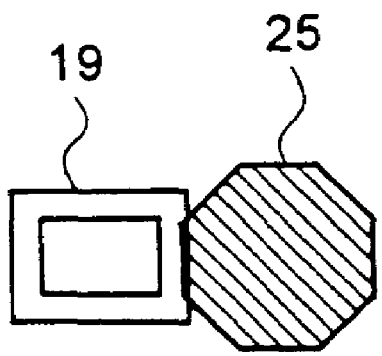
FIG. 14C is a schematic diagram for explaining the relative positions of the columnar spacer and a single contact hole in the case where the columnar spacer is formed in such a size as to be superposed with a part of the single contact hole and the substrates attached to each other are displaced from each other.

In contrast, FIGS. 14A to 14C schematically show the relative positions of the columnar spacer 25 and a single contact hole 19 in the case where the columnar spacer 25 is superposed with a part of the single contact hole 19. The hatched portion represents the grounding area of the columnar spacer 25 and the first substrate 1. As shown in FIG. 14A, assuming that the columnar spacer 25 is superposed with a part of the single contact hole 19 (without any substrate displacement), the grounding area of the columnar spacer 25 and the first substrate 1 (the area of the hatched portion) is 260.00 µm$^2$, for example.

Next, in the case where the second substrate 2 is displaced by 5 µm in one direction (leftward, for example) with respect to the first substrate 1 as shown in FIG. 14B, the grounding area is reduced to 190.00 µm$^2$. Also in the case where the second substrate 2 is displaced by 5 µm in the opposite direction (rightward) with respect to the first substrate 1 as shown in FIG. 14C, on the other hand, the grounding area is increased to 323.75 µm$^2$.

As described above, in the case where the columnar spacer 25 is formed in such a size as to be superposed with a part of a single contact hole 19, the grounding area is varied by a maximum of 133.75 µm$^2$ between 190.00 µm$^2$ and 323.75 µm$^2$.

As seen from the foregoing description, the grounding area of the columnar spacer 25 and the first substrate 1 with the substrate displaced is less varied in the case where the columnar spacer 25 is formed in superposed relation with a part of each of two contact holes 19 than in the case where it is formed in superposed relation with a part of a single contact hole 19. The magnitude of pressure under which the press work is carried out for attaching the substrates to each other or the liquid crystal injection time is varied with the grounding area. Therefore, the smaller the variation of the grounding area, the more desirable for the purposes of fabrication of the liquid crystal display apparatus. In other words, the fabrication of the liquid crystal display apparatus is facilitated by forming the columnar spacer 25 in such a manner as to be superposed with a part of each of two contact holes 19.

It will thus be understood from the foregoing description that various corrections and modifications of the invention are possible. This invention, therefore, should be understood to be embodied without departing from the scope of the claims appended hereto regardless of the concrete description contained herein.

What is claimed is:

1. A liquid crystal display apparatus comprising:
a pair of substrates with at least a liquid crystal layer therebetween;
a columnar spacer arranged between at least said two substrates; and
a plurality of pixels for display;
wherein at least one of said pixels includes said columnar spacer and a contact hole,
wherein said columnar spacer has an area superposed with said contact hole and an area not superposed with said contact hole in the cross section thereof parallel to said substrates;
wherein said columnar spacer is arranged in such a manner that the direction in which the substrate formed with said columnar spacer is rubbed is at right angle to the direction along the minimum width of said columnar spacer; and
wherein said columnar spacer has the minimum width in a direction at a right angle to said rubbing direction, and the width is 2 µm or more smaller than the width of an opening of the contact hole in the direction at a right angle to said rubbing direction.

2. A liquid crystal display apparatus as described in claim 1, wherein the maximum width of the cross section of said columnar spacer is larger than the maximum width of an opening of the contact hole formed in one of the substrates.

3. A liquid crystal display apparatus as described in claim 2, wherein the area of the cross section of said columnar spacer is larger than the area of said opening.

4. A liquid crystal display apparatus as described in claim 1, wherein an area of said columnar spacer superposed with said contact hole is superposed with a part of said contact hole.

5. A liquid crystal display apparatus as described in claim 4, wherein said area is superposed with a part of each of a plurality of contact holes.

6. A liquid crystal display apparatus as described in claim 1, wherein said columnar spacer has the maximum width in said rubbing direction, and the width is 2 µm or more larger than the width of an opening of the contact hole in said rubbing direction.

7. A liquid crystal display apparatus as described in claim 1, wherein said pixel has a transmissive region for transmission type display and a reflective region for reflection type display, and said columnar spacer is arranged in said reflective region.

8. A liquid crystal display apparatus as described in claim 1, wherein said pixel has a transmissive region for transmission type display, and said columnar spacer is formed on an auxiliary capacitance wiring.

9. A liquid crystal display apparatus as described in claim 1, wherein one of the substrates is formed with a plurality of electrical wirings and switching elements for supplying a voltage to the pixels, an inter-layer insulating film for covering at least part of said switching elements, and pixel electrodes above at least a part of said inter-layer insulating film, and
said contact hole is formed in such a manner as to electrically connect one of said pixel electrodes to a lead electrode of said switching element.

10. A liquid crystal display apparatus as described in claim 1, wherein said columnar spacer is black.

11. A liquid crystal display apparatus as described in claim 1, wherein said liquid crystal layer is formed of a material having a vertical alignment.

12. A liquid crystal display apparatus as described in claim 1, wherein said columnar spacer is formed in at least one pixel in the display area.

13. The liquid crystal display apparatus of claim 1, wherein the columnar spacer is located between two contact holes and overlaps with part of each of the two contact holes.

14. The liquid crystal display apparatus of claim 1, wherein a plurality of the spacers are provided in the liquid crystal display apparatus.

15. A liquid crystal display apparatus comprising:
first and second substrates with at least a liquid crystal layer therebetween;
a columnar spacer arranged between at least said first and second substrates;
a plurality of pixels for display;
wherein, on the first substrate, there are provided:
(a) a switching element for switching one of the pixels on and off;
(b) an interlayer insulating film covering at least part of the switching element;
(c) a pixel electrode provided above at least part of the interlayer insulating layer; and
(d) a contact hole for electrically connecting the pixel electrode to a lead electrode of the switching element;
wherein the columnar spacer is formed on the second substrate;
wherein the columnar spacer is arranged on the second substrate so that part of the columnar spacer covers part of an opening of the contact hole without being located inside the contact hole; and
an interior of the contact hole is filled, through the opening of the contact hole, with liquid crystal of the liquid crystal layer.

16. The liquid crystal display apparatus of claim 15, wherein the columnar spacer is located between two contact holes and overlaps with part of each of the two contact holes.

17. A liquid crystal display apparatus as described in claim 15, wherein the maximum width of the cross section of said columnar spacer is larger than the maximum width of an opening of the contact hole formed in one of the substrates.

18. A liquid crystal display apparatus as described in claim 15, wherein an area of said columnar spacer superposed with said contact hole is superposed with a part of said contact hole.

19. A liquid crystal display apparatus as described in claim 18, wherein said area is superposed with a part of each of a plurality of contact holes.

20. A liquid crystal display apparatus as described in claim 15, wherein said columnar spacer is arranged in such a manner that the direction in which the substrate formed with said columnar spacer is rubbed is at right angles to the direction along the minimum width of said columnar spacer.

21. A liquid crystal display apparatus as described in claim 20, wherein said columnar spacer has the maximum width in said rubbing direction, and the width is 2 µm or more larger than the width of an opening of the contact hole in said rubbing direction.

22. A liquid crystal display apparatus as described in claim 20, wherein said columnar spacer has the minimum width in a direction at a right angle to said rubbing direction, and the width is 2 µm or more smaller than the width of said opening in the direction at a right angle to said rubbing direction.

23. A liquid crystal display apparatus as described in claim 15, wherein said pair of substrates are attached to each other without a rubbing process.

24. A liquid crystal display apparatus as described in claim 15, wherein said pixel has a transmissive region for transmission type display and a reflective region for reflection type display, and said columnar spacer is arranged in said reflective region.

25. A liquid crystal display apparatus as described in claim 15, wherein said pixel has a transmissive region for transmission type display, and said columnar spacer is formed on an auxiliary capacitance wiring.

26. A liquid crystal display apparatus as described in claim 15, wherein said columnar spacer is black.

27. A liquid crystal display apparatus as described in claim 15, wherein said liquid crystal layer is formed of a material having a vertical alignment.

28. A liquid crystal display apparatus as described in claim 15, wherein said columnar spacer is formed in at least one pixel in the display area.

* * * * *